(12) United States Patent
Hosseini et al.

(10) Patent No.: US 11,497,007 B2
(45) Date of Patent: Nov. 8, 2022

(54) SOUNDING REFERENCE SIGNAL CONFIGURATION AND TRANSPORT BLOCK SIZE SCALING IN LOW LATENCY SYSTEMS

(71) Applicant: QUALCOMM Incorporated, San Diego, CA (US)

(72) Inventors: Seyedkianoush Hosseini, San Diego, CA (US); Wanshi Chen, San Diego, CA (US); Shimman Arvind Patel, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/969,586

(22) Filed: May 2, 2018

(65) Prior Publication Data

US 2018/0324771 A1 Nov. 8, 2018

Related U.S. Application Data

(60) Provisional application No. 62/502,560, filed on May 5, 2017.

(51) Int. Cl.
*H04W 72/02* (2009.01)
*H04W 72/04* (2009.01)
(Continued)

(52) U.S. Cl.
CPC ......... *H04W 72/042* (2013.01); *H04L 5/0048* (2013.01); *H04L 5/0051* (2013.01);
(Continued)

(58) Field of Classification Search
CPC . H04L 25/0226; H04L 5/0048; H04L 5/0051; H04L 5/0092; H04W 52/10;
(Continued)

(56) References Cited

U.S. PATENT DOCUMENTS 9,210,670 B2 12/2015 Papasakellariou
11,019,620 B2 5/2021 Ji et al.
(Continued)

FOREIGN PATENT DOCUMENTS

CN 104468030 A 3/2015
CN 105191185 A 12/2015
(Continued)

OTHER PUBLICATIONS

Ericsson: "On sTTI Scheduling Options", 3GPP Draft; R1-1706074, 3rd Generation Partnership Project (3GPP), Mobile Competence Centre, 650, Route Des Lucioles, F-06921 Sophia-Antipolis Cedex, France, vol. RAN WG1, No. Spokane, US; 20170403-20170407 Apr. 2, 2017, XP051244182, Retrieved from the Internet: URL:http://www.3gpp.org/ftp/Meetings_3GPP_SYNC/RAN1/Docs/ [retrieved on Apr. 2, 2017], 7 pages.
(Continued)

*Primary Examiner* — Steven H Nguyen
(74) *Attorney, Agent, or Firm* — Holland & Hart LLP

(57) ABSTRACT

Methods, systems, and devices for wireless communication are described. A base station may transmit an indication of first and second configurations for sounding reference signal (SRS) transmissions during first and second transmission time intervals (TTIs) having different durations. A user equipment (UE) may identify an SRS to be transmitted and determine a configuration for the SRS transmission based on the TTI duration and the received indication of the first and second configurations. The UE may then transmit the SRS based on the configuration. A base station may receive an SRS during a TTI and may determine a channel quality based at least in part on the SRS. Additionally, a device may identify data to transmit during a TTI, determine a number of resource elements available for transmission of the data during a TTI, and determine a transport block size (TBS) for
(Continued)

the data transmission based on the available resource elements.

19 Claims, 22 Drawing Sheets

(51) Int. Cl.
*H04W 52/32* (2009.01)
*H04L 5/00* (2006.01)
*H04W 52/14* (2009.01)
*H04L 25/02* (2006.01)
*H04W 52/10* (2009.01)
*H04W 52/36* (2009.01)

(52) U.S. Cl.
CPC .......... *H04L 5/0092* (2013.01); *H04W 52/146* (2013.01); *H04W 52/322* (2013.01); *H04W 52/325* (2013.01); *H04W 72/0446* (2013.01); *H04L 25/0226* (2013.01); *H04W 52/10* (2013.01); *H04W 52/367* (2013.01)

(58) Field of Classification Search
CPC ............ H04W 52/146; H04W 52/322; H04W 52/325; H04W 52/367; H04W 72/042; H04W 72/0446
See application file for complete search history.

(56) References Cited

U.S. PATENT DOCUMENTS

| | | | |
|---|---|---|---|
| 2013/0114532 | A1 | 5/2013 | Choi et al. |
| 2014/0071903 | A1 | 3/2014 | Sorrentino et al. |
| 2015/0016317 | A1 | 1/2015 | Park et al. |
| 2015/0085787 | A1* | 3/2015 | Ouchi ................ H04L 5/0037 370/329 |
| 2015/0110017 | A1 | 4/2015 | Park et al. |
| 2015/0334729 | A1 | 11/2015 | Ji et al. |
| 2016/0112181 | A1 | 4/2016 | Tabet et al. |
| 2016/0219534 | A1* | 7/2016 | Hao .................... H04W 52/54 |
| 2017/0013618 | A1 | 1/2017 | Shin |
| 2017/0111160 | A1 | 4/2017 | Chen et al. |
| 2017/0164363 | A1* | 6/2017 | Zhang ............... H04W 72/0446 |
| 2017/0208575 | A1 | 7/2017 | Chen et al. |
| 2017/0290008 | A1 | 10/2017 | Tooher et al. |
| 2018/0049228 | A1* | 2/2018 | Lee ..................... H04L 5/005 |
| 2018/0054819 | A1 | 2/2018 | Meng |
| 2018/0199322 | A1 | 7/2018 | Takeda et al. |
| 2019/0037562 | A1* | 1/2019 | Park .................... H04L 1/00 |
| 2019/0053256 | A1* | 2/2019 | Takeda ................. H04L 27/26 |
| 2019/0116559 | A1* | 4/2019 | Takeda ............... H04W 52/221 |
| 2019/0223209 | A1* | 7/2019 | Li ...................... H04L 5/0053 |
| 2019/0289555 | A1* | 9/2019 | Zhang ................ H04W 52/14 |
| 2019/0357248 | A1* | 11/2019 | Takeda ................ H04L 27/2607 |
| 2019/0373560 | A1* | 12/2019 | Ouchi .................. H04W 80/08 |
| 2020/0305086 | A1* | 9/2020 | Zhang ................ H04W 52/146 |
| 2021/0282090 | A1* | 9/2021 | Zhang ................ H04W 52/146 |

FOREIGN PATENT DOCUMENTS

| | | |
|---|---|---|
| CN | 106134263 A | 11/2016 |
| EP | 3134991 A1 | 3/2017 |
| JP | 2013236289 A | 11/2013 |
| JP | 2017529782 A | 10/2017 |
| WO | WO-2014020815 A1 | 2/2014 |
| WO | WO-2014022747 A1 | 2/2014 |
| WO | WO-2015179134 A1 | 11/2015 |
| WO | WO-2015179146 A1 | 11/2015 |
| WO | WO-2016029736 A1 | 3/2016 |
| WO | WO-2016159730 A1 | 10/2016 |
| WO | WO-2017014048 A1 | 1/2017 |
| WO | WO-2017142029 A1 | 8/2017 |
| WO | WO-2017173216 A1 | 10/2017 |
| WO | WO-2018175784 A1 | 9/2018 |

OTHER PUBLICATIONS

Huawei et al., "Discussion on sTTI Scheduling", 3GPP Draft; R1-1704263, 3rd Generation Partnership Project (3GPP), Mobile Competence Centre, 650, Route Des Lucioles, F-06921 Sophia-Antipolis Cedex, France, vol. RAN WG1, No. Spokane, USA; 20170403-20170407, Apr. 2, 2017, XP051242415, Retrieved from the Internet: URL:http://www.3gpp.org/ftp/Meetings_3GPP_SYNC/RAN1/Docs/ [retrieved on Apr. 2, 2017], 8 pages.
International Search Report and Written Opinion—PCT/US2018/030880—ISA/EPO—dated Oct. 29, 2018.
Partial International Search Report—PCT/US2018/030880—ISA/EPO—dated Aug. 30, 2018.
Taiwan Search Report—TW107115019—TIPO—dated Jun. 3, 2021.
Taiwan Search Report—TW107115019—TIPO—dated Oct. 6, 2021.
Huawei., et al., "Discussion on sTTI Scheduling", 3GPP TSG RAN WG1 Meeting #88, R1-1701733 Athens, Greece, Feb. 13-17, 2017, 8 Pages.
Huawei, et al., "Processing Time Reduction and Related Procedures for Short TTI", 3GPP TSG RAN WG1 Meeting #87, 3GPP Draft, R1-1611167, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 14-18, 2016, (Nov. 5, 2016), 8 Pages, XP051189740, Retrieved from the Internet: URL: http://www.3gpp.org/ftp/tsg_ran/WG1_RL1/TSGR1_87/Docs/ [retrieved on Nov. 5, 2016].
Huawei., et al., "UL Power Control for Short TTI", 3GPP TSG RAN WG1 Meeting #88, R1-1701738, Athens, Greece, Feb. 13-17, 2017, 4 Pages.
Qualcomm Incorporated: "SRS Transmission on TDD CCs without PUSCH", 3GPP TSG RAN WG1 Meeting #86, R1-166286, Gothenburg, Sweden Aug. 22-26, 2016, pp. 1-5.
Qualcomm Incorporated: "Transmit Power Template for Contiguous SRS + sTTI" [online], 3GPP Draft, 3GPP TSG-WG RAN4 Meeting #82-Bis, R4-1703972, Spokane, US, Date Apr. 3-7, 2017, pp. 1-3, Retrieved from the Internet URL: http://www.3gpp.org/ftp/tsg_ran/WG4_Radio/TSGR4_82Bis/Docs/R4-1703972.zip.
Ericsson: "DCI for sTTI Scheduling", 3GPP Draft, 3GPP TSG-RAN WG1 #85, R1-165294, 3rd Generation Partnership Project (3GPP), Mobile Competence Centre, 650, Route Des Lucioles, F-06921 Sophia-Antipolis Cedex, France, vol. RAN WG1, No. Nanjing, P. R. China, May 23, 2016-May 27, 2016 May 13, 2016 (May 13, 2016), XP051096742, pp. 1-5, Retrieved from the Internet: URL: http://www.3gpp.org/ftp/tsg_ran/WG1_RL1/TSGR1_85/Docs/ [retrieved on May 13, 2016], Section 2.1.1.
Huawei, et al., "Details on Power Control for SRS on TDD CCs without Pusch", 3GPP Draft, 3GPP TSG RAN WG1 Meeting #86, R1-166128, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016 Aug. 21, 2016 (Aug. 21, 2016), XP051125227, pp. 1-3, Retrieved from the Internet: URL:http://www.3gpp.org/ftp/Meetings_3GPP_SYNC/RAN1/Docs/ [retrieved on Aug. 21, 2016], Section 2.
Qualcomm Incorporated: "Uplink Grant for RACH-Less Handover", 3GPP TSG-RAN2 Meeting #95bis, 3GPP Draft, R2-167135_RACHLESSHO_UPLINK_GRANT, 3rd Generation Partnership Project (3GPP), Mobile Competence Centre; 650, Route Des Lucioles; F-06921 Sophia-Antipolis Cedex; France, vol. RAN WG2, No. Kaohsiung, Taiwan; Oct. 10, 2016-Oct. 14, 2016, Oct. 9, 2016 (Oct. 9, 2016), 3 Pages, XP051151529, Retrieved from the Internet: URL: http://www.3gpp.org/ftp/Meetings_GPP_SYNC/RAN2/Docs/ [retrieved on Oct. 9, 2016] the whole document.
Samsung: "SRS Enhancements in Rel-10", 3GPP TSG RAN WG1 #60, R1-101189, San Francisco, USA, Feb. 22-26, 2010, pp. 1-4.

* cited by examiner

SOUNDING REFERENCE SIGNAL CONFIGURATION AND TRANSPORT BLOCK SIZE SCALING IN LOW LATENCY SYSTEMS

CROSS REFERENCES

The present Application for patent claims benefit of U.S. Provisional Patent Application No. 62/502,560 by Hosseini et al., entitled "Sounding Reference Signal Configuration and Transport Block Size Scaling in Low Latency Systems," filed May 5, 2017, assigned to the assignee hereof and expressly incorporated by reference in its entirety.

BACKGROUND

The following relates generally to wireless communication and more specifically to sounding reference signal (SRS) configuration and transport block size (TBS) scaling in low latency systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). Some wireless communications systems may support different types of communications (e.g., mobile broadband (MBB) communications and low latency communications). In some cases, the duration of transmission time intervals (TTIs) used for communication may be different for different types of communications. For example, the duration of a TTI used for MBB communications (e.g., 1 ms) may be longer than the duration of a TTI used for low latency communications (e.g., 0.5 ms or less). Conventional techniques for communicating during TTIs having different durations may be deficient.

SUMMARY

The described techniques relate to improved methods, systems, devices, or apparatuses for communicating during transmission time intervals (TTIs) having different durations. In one example, a user equipment (UE) may be configured to transmit sounding reference signals (SRSs) differently during TTIs having different durations. In some cases, the UE may be triggered to transmit an SRS in a TTI having a particular duration (e.g., associated with a particular type of communication) based on receiving a grant (e.g., uplink or downlink grant) in a TTI having the same duration. For example, the UE may receive shortened downlink control information (DCI) (sDCI) in sTTI n (e.g., slot n) which may schedule an SRS transmission from the UE in sTTI n+4 (e.g., slot n+4) or after sTTI n+4 (e.g., in the first SRS opportunity in or after sTTI n+4).

The UE may then determine a configuration for transmitting the SRS based on the duration of the TTI in which the grant was received or based on the duration of the TTI in which the SRS transmission is scheduled (e.g., which may be based on the type of communications associated with the SRS transmission). In another example, a wireless device (e.g., a base station or a UE) within a wireless communications system may be configured to determine a transport block size (TBS) for a transport block based on a duration of a TTI in which the transport block is scheduled to be transmitted (e.g., which may be based on the type of communications associated with the transport block). For instance, the wireless device may determine the TBS based on a number of resource elements available for data within a TTI or a shortened TTI (sTTI) in which the transport block is scheduled to be transmitted.

A method for wireless communication in a system that supports a first TTI duration and a second TTI duration that is greater than the first TTI duration is described. The method may include receiving a grant in DCI or sDCI, identifying an SRS to be transmitted based at least in part on receiving the grant, determining a configuration for the SRS based at least in part on the grant being received in the DCI or the sDCI, and transmitting the SRS during a TTI having the first TTI duration or a TTI having the second TTI duration based at least in part on the configuration.

An apparatus for wireless communication in a system that supports a first TTI duration and a second TTI duration that is greater than the first TTI duration is described. The apparatus may include means for receiving a grant in DCI or sDCI, means for identifying an SRS to be transmitted based at least in part on receiving the grant, means for determining a configuration for the SRS based at least in part on the grant being received in the DCI or the sDCI, and means for transmitting the SRS during a TTI having the first TTI duration or a TTI having the second TTI duration based at least in part on the configuration.

Another apparatus for wireless communication in a system that supports a first TTI duration and a second TTI duration that is greater than the first TTI duration is described. The apparatus may include a processor, memory in electronic communication with the processor, and instructions stored in the memory. The instructions may be operable to cause the processor to receive a grant in DCI or sDCI, identify an SRS to be transmitted based at least in part on receiving the grant, determine a configuration for the SRS based at least in part on the grant being received in the DCI or the sDCI, and transmit the SRS during a TTI having the first TTI duration or a TTI having the second TTI duration based at least in part on the configuration.

A non-transitory computer readable medium for wireless communication in a system that supports a first TTI duration and a second TTI duration that is greater than the first TTI duration is described. The non-transitory computer-readable medium may include instructions operable to cause a processor to receive a grant in DCI or sDCI, identify an SRS to be transmitted based at least in part on receiving the grant, determine a configuration for the SRS based at least in part on the grant being received in the DCI or the sDCI, and transmit the SRS during a TTI having the first TTI duration or a TTI having the second TTI duration based at least in part on the configuration.

In some examples of the method, apparatus, and non-transitory computer-readable medium described above, determining the configuration for the SRS based at least in part on the grant being received in the DCI or the sDCI includes determining the configuration for the SRS based at least in part on the SRS being scheduled to be transmitted in the TTI having the first TTI duration or the TTI having the second TTI duration. Some examples of the method, apparatus, and non-transitory computer-readable medium described above may further include processes, features, means, or instructions for receiving an indication of a first configuration for SRS transmissions during TTIs having the first TTI duration and an indication of a second configuration for SRS transmissions during TTIs having the second TTI duration, wherein the configuration for the SRS may be determined based at least in part on the received indications.

In some examples of the method, apparatus, and non-transitory computer-readable medium described above, determining the configuration for the SRS comprises determining a transmit power configuration for the SRS according to the first configuration when the SRS is scheduled to be transmitted in the TTI having the first TTI duration and according to the second configuration when the SRS is scheduled to be transmitted in the TTI having the second TTI duration. In some examples of the method, apparatus, and non-transitory computer-readable medium described above, determining the transmit power configuration for the SRS comprises receiving one or more open-loop power parameters corresponding to the SRS being scheduled to be transmitted in the TTI having the first TTI duration or the TTI having the second TTI duration and selecting a closed-loop parameter corresponding to the SRS being scheduled to be transmitted in the TTI having the first TTI duration or the TTI having the second TTI duration.

In some examples of the method, apparatus, and non-transitory computer-readable medium described above, the closed-loop power parameter may be a power control adjustment state corresponding to the SRS being scheduled to be transmitted in the TTI having the first TTI duration or the TTI having the second TTI duration. In some examples of the method, apparatus, and non-transitory computer-readable medium described above, the one or more open-loop power parameters comprise a maximum transmit power, an SRS offset, or a bandwidth used to transmit the SRS, or a combination thereof, corresponding to the SRS being scheduled to be transmitted in the TTI having the first TTI duration or the TTI having the second TTI duration.

In some examples of the method, apparatus, and non-transitory computer-readable medium described above, receiving the grant in DCI or sDCI includes receiving the grant in sDCI, wherein the SRS may be transmitted according to the configuration corresponding to the TTI having the first TTI duration based at least in part on receiving the grant in sDCI. In some examples of the method, apparatus, and non-transitory computer-readable medium described above, receiving the grant in DCI or sDCI includes receiving the grant in DCI, wherein the SRS may be transmitted according to the configuration corresponding to the TTI having the second TTI duration based at least in part on receiving the grant in DCI.

Some examples of the method, apparatus, and non-transitory computer-readable medium described above may further include processes, features, means or instructions for receiving multiple transmit power configurations during multiple TTIs for the SRS to be transmitted during the TTI having the first TTI duration or the TTI having the second TTI duration, and determining the configuration for the SRS based at least in part on one or more of the multiple transmit power configurations. In some examples of the method, apparatus, and non-transitory computer-readable medium described above, determining the configuration for the SRS based on one or more of the multiple transmit power configurations comprises determining the configuration for the SRS based on an accumulation of the multiple transmit power configurations.

In some examples of the method, apparatus, and non-transitory computer-readable medium described above, determining the configuration for the SRS based on one or more of the multiple transmit power configurations comprises determining the configuration for the SRS based on a highest or lowest transmit power indicated in one of the multiple transmit power configurations. In some examples of the method, apparatus, and non-transitory computer-readable medium described above, determining the configuration for the SRS based on one or more of the multiple transmit power configurations comprises determining the configuration for the SRS based on an average of transmit powers indicated in the multiple transmit power configurations. In some examples of the method, apparatus, and non-transitory computer-readable medium described above, the multiple transmit power configurations indicate a same transmit power configuration to be used to transmit the SRS.

Some examples of the method, apparatus, and non-transitory computer-readable medium described above may further include processes, features, means, or instructions for identifying a collision between a first SRS transmission during a first TTI having the first TTI duration and a second SRS transmission during a second TTI having the second TTI duration. In some examples of the method, apparatus, and non-transitory computer-readable medium described above, the first SRS transmission and the second SRS transmission are scheduled on a same carrier or on different carriers. In some examples of the method, apparatus, and non-transitory computer-readable medium described above, the configuration indicates a first priority for SRS transmissions during TTIs having the first TTI duration and a second priority for SRS transmissions during TTIs having the second TTI duration. Some examples of the method, apparatus, and non-transitory computer-readable medium described above may further include processes, features, means, or instructions for determining whether to transmit the first SRS, the second SRS, or both based at least in part on comparing the first priority to the second priority.

In some examples of the method, apparatus, and non-transitory computer-readable medium described above, determining whether to transmit the first SRS, the second SRS, or both comprises determining whether to transmit the first SRS, the second SRS, or both based at least in part on a power constraint. In some examples of the method, apparatus, and non-transitory computer-readable medium described above, determining whether to transmit the first SRS, the second SRS, or both comprises determining whether to transmit the first SRS, the second SRS, or both based at least in part on whether a first bandwidth associated with the first SRS overlaps with a second bandwidth associated with the second SRS.

Some examples of the method, apparatus, and non-transitory computer-readable medium described above may further include processes, features, means, or instructions for transmitting the first SRS and the second SRS simultaneously. Some examples of the method, apparatus, and non-transitory computer-readable medium described above may further include processes, features, means, or instructions for refraining from transmitting the first SRS and the second SRS.

A method for wireless communication in a system that supports a first TTI duration and a second TTI duration that is greater than the first TTI duration is described. The method may include transmitting an indication of a first configuration for SRS transmissions during TTIs having the first TTI duration and an indication of a second configuration for SRS transmissions during TTIs having the second TTI duration, receiving an SRS during a TTI, wherein a configuration of the SRS is based at least in part on either the first configuration or the second configuration, and determining at least a channel quality of a channel used to transmit data during the TTI based at least in part on the SRS.

An apparatus for wireless communication in a system that supports a first TTI duration and a second TTI duration that is greater than the first TTI duration is described. The apparatus may include means for transmitting an indication of a first configuration for SRS transmissions during TTIs having the first TTI duration and an indication of a second configuration for SRS transmissions during TTIs having the second TTI duration, means for receiving an SRS during a TTI, wherein a configuration of the SRS is based at least in part on either the first configuration or the second configuration, and means for determining at least a channel quality of a channel used to transmit data during the TTI based at least in part on the SRS.

Another apparatus for wireless communication in a system that supports a first TTI duration and a second TTI duration that is greater than the first TTI duration is described. The apparatus may include a processor, memory in electronic communication with the processor, and instructions stored in the memory. The instructions may be operable to cause the processor to transmit an indication of a first configuration for SRS transmissions during TTIs having the first TTI duration and an indication of a second configuration for SRS transmissions during TTIs having the second TTI duration, receive an SRS during a TTI, wherein a configuration of the SRS is based at least in part on either the first configuration or the second configuration, and determine at least a channel quality of a channel used to transmit data during the TTI based at least in part on the SRS.

A non-transitory computer readable medium for wireless communication in a system that supports a first TTI duration and a second TTI duration that is greater than the first TTI duration is described. The non-transitory computer-readable medium may include instructions operable to cause a processor to transmit an indication of a first configuration for SRS transmissions during TTIs having the first TTI duration and an indication of a second configuration for SRS transmissions during TTIs having the second TTI duration, receive an SRS during a TTI, wherein a configuration of the SRS is based at least in part on either the first configuration or the second configuration, and determine at least a channel quality of a channel used to transmit data during the TTI based at least in part on the SRS.

In some examples of the method, apparatus, and non-transitory computer-readable medium described above, transmitting the indication of the first configuration and the indication of the second configuration comprises transmitting one or more open-loop power parameters corresponding to the TTI having either the first TTI duration or the second TTI duration. In some examples of the method, apparatus, and non-transitory computer-readable medium described above, the one or more open-loop power parameters comprises a maximum transmit power, an SRS offset, or a bandwidth used to transmit the SRS, or a combination thereof corresponding to the TTI having either the first TTI duration or the second TTI duration.

In some examples of the method, apparatus, and non-transitory computer-readable medium described above, the SRS comprises a periodic SRS. In some examples of the method, apparatus, and non-transitory computer-readable medium described above, the configuration of the SRS comprises an SRS periodicity, a subframe offset, or a bandwidth, or a combination thereof corresponding to the TTI having either the first TTI duration or the second TTI duration.

In some examples of the method, apparatus, and non-transitory computer-readable medium described above, the SRS comprises an aperiodic SRS. Some examples of the method, apparatus, and non-transitory computer-readable medium described above may further include processes, features, means, or instructions for transmitting a grant in sDCI, wherein the SRS may be received according to the first configuration during the TTI having the first TTI duration based at least in part on the transmitted grant. Some examples of the method, apparatus, and non-transitory computer-readable medium described above may further include processes, features, means, or instructions for transmitting a grant in DCI, wherein the SRS may be received according to the second configuration during the TTI having the second TTI duration based at least in part on the transmitted grant.

A method for wireless communication in a system that supports a first TTI duration and a second TTI duration that is greater than the first TTI duration is described. The method may include identifying data to transmit during a TTI having the first TTI duration, determining a number of resource elements available for transmission of the data during the TTI having the first TTI duration, and determining a TBS for transmission of the data during the TTI having the first TTI duration based at least in part on the determined number of resource elements available for transmission of the data during the TTI having the first TTI duration.

An apparatus for wireless communication in a system that supports a first TTI duration and a second TTI duration that is greater than the first TTI duration is described. The apparatus may include means for identifying data to transmit during a TTI having the first TTI duration, means for determining a number of resource elements available for transmission of the data during the TTI having the first TTI duration, and means for determining a TBS for transmission of the data during the TTI having the first TTI duration based at least in part on the determined number of resource elements available for transmission of the data during the TTI having the first TTI duration.

Another apparatus for wireless communication in a system that supports a first TTI duration and a second TTI duration that is greater than the first TTI duration is described. The apparatus may include a processor, memory in electronic communication with the processor, and instructions stored in the memory. The instructions may be operable to cause the processor to identify data to transmit during a TTI having the first TTI duration, determine a number of resource elements available for transmission of the data during the TTI having the first TTI duration, and determine a TBS for transmission of the data during the TTI having the first TTI duration based at least in part on the determined number of resource elements available for transmission of the data during the TTI having the first TTI duration.

A non-transitory computer readable medium for wireless communication in a system that supports a first TTI duration and a second TTI duration that is greater than the first TTI duration is described. The non-transitory computer-readable medium may include instructions operable to cause a processor to identify data to transmit during a TTI having the first TTI duration, determine a number of resource elements available for transmission of the data during the TTI having the first TTI duration, and determine a TBS for transmission of the data during the TTI having the first TTI duration based at least in part on the determined number of resource elements available for transmission of the data during the TTI having the first TTI duration.

In some examples of the method, apparatus, and non-transitory computer-readable medium described above, determining a number of resource elements available for transmission of the data during the TTI having the first TTI duration comprises identifying a number of resource elements within the TTI having the first TTI duration that may be reserved for control information in a control channel associated with communications during a TTI having the second TTI duration.

In some examples of the method, apparatus, and non-transitory computer-readable medium described above, identifying the number of resource elements within the TTI having the first TTI duration that may be reserved for control information comprises identifying a default number of resource elements within the TTI having the first TTI duration that may be reserved for control information. In some examples of the method, apparatus, and non-transitory computer-readable medium described above, the control channel comprises a PDCCH.

In some examples of the method, apparatus, and non-transitory computer-readable medium described above, determining a number of resource elements available for transmission of the data during the TTI having the first TTI duration comprises identifying a number of resource elements within the TTI having the first TTI duration that may be reserved for control information in a control channel associated with communications during a TTI having the first TTI duration. In some examples of the method, apparatus, and non-transitory computer-readable medium described above, the control channel comprises an sPDCCH.

Some examples of the method, apparatus, and non-transitory computer-readable medium described above may further include processes, features, means, or instructions for determining whether a transmission mode (TM) used for communication during the TTI having the first TTI duration may be cell-specific reference signal (CRS)-based or demodulation reference signal (DMRS)-based. Some examples of the method, apparatus, and non-transitory computer-readable medium described above may further include processes, features, means, or instructions for determining the TBS for the transmission based at least in part on determining whether the TM may be CRS-based or DMRS-based.

DETAILED DESCRIPTION

Some wireless communications systems may support different types of communications between a base station and a user equipment (UE). For example, a wireless communications system may support low latency communications and mobile broadband (MBB) communications between a base station and a UE. Such different types of communications may be associated with different transmission time intervals (TTIs). For example, devices may support low latency communications during TTIs having a shorter duration than TTIs used for MBB communications. In some wireless communications system, devices may communicate using the same configurations during TTIs with different durations associated with different types of communications. In some cases, however, the configuration used for communicating during a TTI with one duration may not be appropriate for communicating during a TTI with a different duration.

As described herein, wireless devices may support efficient techniques for communicating using different configurations in TTIs having different durations for different types of communications. In some examples, a UE may identify an SRS to be transmitted to a base station, and the UE may determine a configuration for transmitting the SRS based on a type of communications associated with the SRS transmission or a duration of a TTI to be used for the SRS transmission. Additionally, devices in a wireless communications system described herein may support efficient techniques for determining a transport block size (TBS) for a transmission in a TTI having a particular duration based on the number of resource elements available for transmitting the transport block in the TTI (e.g., based on the amount of overhead in the TTI).

Aspects of the disclosure introduced above are described below in the context of a wireless communications system. Examples of processes and signaling exchanges that support SRS configuration and TBS scaling in low latency systems are then described. Aspects of the disclosure are further illustrated by and described with reference to apparatus diagrams, system diagrams, and flowcharts that relate to SRS configuration and TBS scaling in low latency systems.

Figure 1:
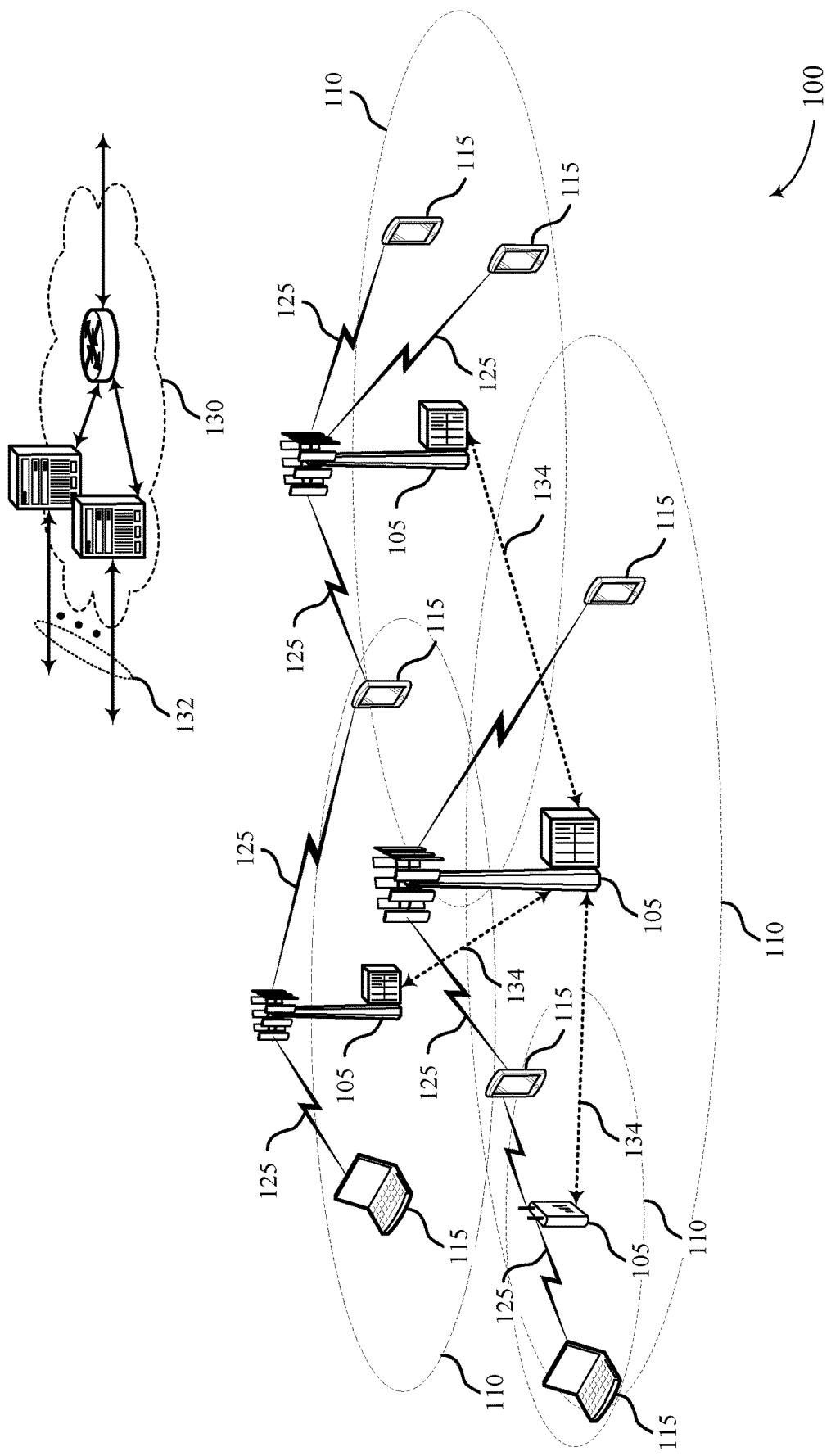
FIG. 1 illustrates an example of a wireless communications system that supports sounding reference signal (SRS) configuration and transport block size (TBS) scaling in low latency systems in accordance with aspects of the present disclosure.

FIG. 1 illustrates an example of a wireless communications system 100 that supports SRS configuration and TBS scaling in low latency systems in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support MBB or enhanced MBB (eMBB) communications, ultra-reliable (i.e., mission critical) communications, low latency communications, ultra-reliable low latency communications (URLLC), and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105 or downlink transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs (such as a shortened TTI (sTTI)).

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., a short TTI) may be used (e.g., a mini-slot). Wireless communications system 100 may employ various TTI durations, including those that facilitate URLLC and MBB communications, in addition to other types of communication associated with LTE and NR.

A resource element may consist of one symbol period and one subcarrier (e.g., a 15 kHz frequency range). In some cases, the numerology employed within a system (i.e., symbol size, subcarrier size, or TTI duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots.

In wireless communications system 100, a UE 115 may be configured to transmit SRS to a base station 105, and the base station 105 may use the SRS to estimate channel quality. As described above, a wireless communications system may support low latency communication during TTIs having a first TTI duration and MBB communication during TTIs having a second TTI duration. In some aspects, a base station 105 may configure a UE 115 to transmit SRS using the same configuration regardless of a type of communications associated with the SRS transmission. In some cases, however, the use of the same configuration for SRS transmissions associated with different types of communication may be inefficient. For instance, in such cases, a UE 115 may utilize too little power for an SRS transmission, and a base station 105 may not be able to determine an accurate channel estimate based on the SRS. Alternatively, a UE 115 may use excessive power for an SRS transmission which may be detrimental to the battery life of the UE 115. Wireless communications system 100 may support efficient techniques for configuring a UE 115 appropriately for SRS transmissions based on a type of communications associated with the SRS transmissions.

Further, in some wireless communications systems, a wireless device (e.g., a base station 105 or a UE 115) may be scheduled to transmit a transport block to a receiving device. In such systems, the wireless device may determine a TBS for the transport block based on the number of resource blocks within a TTI in which the transport block is scheduled to be transmitted. For example, when a wireless device is scheduled to transmit a transport block in a subframe (e.g., for MBB communications), the wireless device may determine a TBS for the transport block based on the number of resource blocks in the subframe. Alternatively, when the wireless device is scheduled to transmit a transport block in an sTTI (e.g., a one slot sTTI for low latency communications), the wireless device may determine a TBS for the transport block based on the number of resource blocks in the sTTI (e.g., half of the number of resource blocks in a subframe for a one-slot sTTI).

In some cases, however, the overhead associated with different slots may be different. That is, different slots may include a different number of resource blocks available for data since, for example, different numbers of resource blocks may be used for control information or reference signals (e.g., demodulation reference signals (DMRSs) or cell-specific reference signals (CRSs)) in different slots. Accordingly, techniques for using the number of resource blocks in a slot (e.g., half of the resource blocks in a subframe) for determining a TBS may be inaccurate and inefficient. Wireless communications system 100 may support efficient techniques for determining the TBS of a transport block to be transmitted in an sTTI. For example, a device may identify the number of resource elements available for transmitting a transport block in an sTTI (e.g., based on overhead in the sTTI), and the device may transmit the transport block according to the determined TBS.

Figure 2:
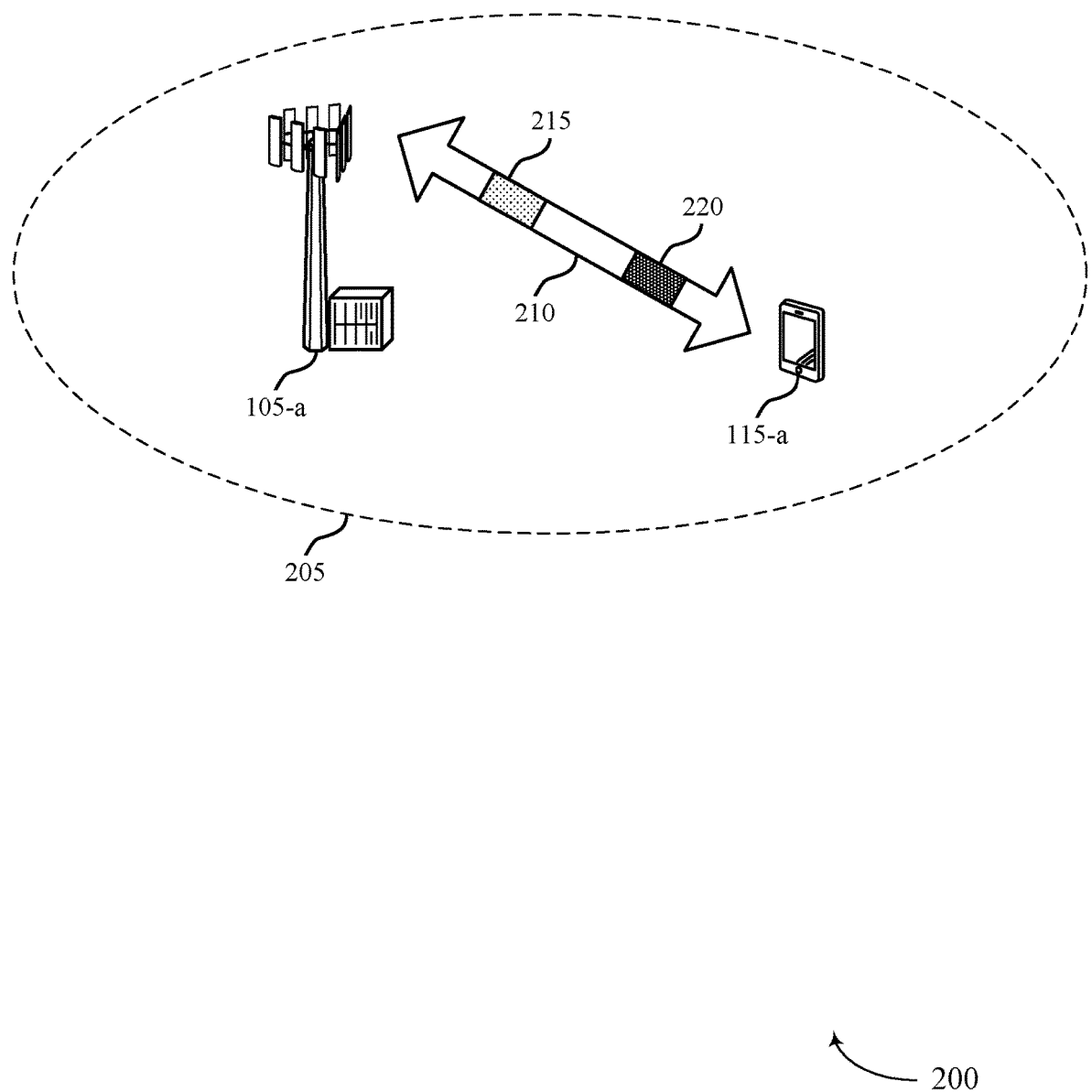
FIG. 2 illustrates an example of a wireless communications system that supports SRS configuration and TBS scaling in low latency systems in accordance with aspects of the present disclosure.

FIG. 2 illustrates an example of a wireless communications system 200 that supports SRS configuration and TBS scaling in low latency systems in accordance with various aspects of the present disclosure. Wireless communications system 200 may implement aspects of wireless communications system 100. Wireless communications system 200 may include base station 105-a and UE 115-a, which may be examples of the corresponding devices described with reference to FIG. 1. In some examples, base station 105-a may be in communication with one or more UEs 115 within geographic coverage area 205. For example, base station 105-a may be in communication with UE 115-a on resources of a carrier 210.

Base station 105-a and UE 115-a may support different types of communications, such as MBB communications and low latency communications. In some examples, different types of communications may be associated with TTIs having different durations. For example, a TTI corresponding to MBB communications may have a longer duration (e.g., 1 ms) than a TTI corresponding to low latency communications (e.g., 0.5 ms). As described herein, base station 105-a and UE 115-a may be configured differently for different types of communications during TTIs having different durations.

In some cases, it may be appropriate for base station 105-a to estimate the quality of a channel to determine which resources to allocate for communication with UE 115-a. Accordingly, base station 105-a may configure UE 115-a to transmit an SRS that may be used to estimate the quality of the channel. In particular, as described herein, base station 105-a may configure UE 115-a with a first configuration for SRS transmissions during TTIs having a first TTI duration (i.e., for low latency communications) and a second configuration for SRS transmissions during TTIs having a second TTI duration (i.e., for MBB communications). Base station 105-a may transmit the indications of the different configurations to UE 115-a in a configuration message 215.

As an example, base station may transmit a first transmit power configuration and a second transmit power configuration to UE 115-a to allow UE 115-a to determine an appropriate transmit power for SRS transmissions associated with different types of communications. In some examples, UE 115-a may determine the transmit power for the SRS transmission based on the following equation:

$$P_{SRS,c}(i) = \min\{P_{CMAX,c}(i), P_{SRS,OFFSET,c}(m) + 10\log_{10}(M_{SRS,c}) + P_{O_{PUSCH},c}(j) + \alpha_c(j) \cdot PL_c + f_c(i)\} dBm \quad (1)$$

In the above equation, $P_{SRS,c}(i)$ may represent the SRS power for transmission in a cell c, $P_{CMAX,c}(i)$, $P_{SRS,OFFSET,c}(m)$ may be an open loop parameter corresponding to a maximum transmit power and an SRS offset respectively; ($M_{SRS,c}$) may be an open loop parameter representing a bandwidth corresponding to an SRS transmission; $P_{O_{PUSCH},c}(j) + \alpha_c(j)$. $PL_c$ may be additional open loop parameters determined based on higher layer signaling; and $f_c(i)$ may be a closed loop parameter representing the current PUSCH power control adjustment state for a serving cell c.

Base station 105-a may thus transmit an indication of a different set of parameters (e.g., open-loop and closed-loop parameters in a transmit power control (TPC) command) for SRS transmissions associated with different types of communications. UE 115-a may then be able to determine an appropriate transmit power for an SRS transmission based on a duration of a TTI to be used to transmit the SRS 220 (or a type of communications associated with the SRS transmission). For instance, UE 115-a may determine a transmit power for an SRS transmission in a TTI having a particular duration based on open-loop parameters received from base station 105-a for SRS transmissions in TTIs having the particular duration and based on a closed-loop parameter selected (i.e., by UE 115-a) based on the SRS being scheduled to be transmitted in the TTI having the particular duration. In some examples, UE 115-a may select a closed-loop parameter to determine the power for an SRS transmission in a TTI based on the closed-loop parameter used for a PUSCH transmission (e.g., the same as the closed-loop parameter used for the PUSCH transmission), and UE 115-a may select a closed-loop parameter to determine the power for an SRS transmission in an sTTI based on the closed-loop parameter used for an sPUSCH transmission (e.g., the same as the closed-loop parameter used for the sPUSCH transmission).

As mentioned above, for low latency communications, the transmit power used for an SRS transmission may be adjusted based on parameters received in a TPC command in, for example, an uplink grant. In some cases, however, UE 115-a may be configured to transmit SRSs in a last symbol of a subframe. In such cases, the UE 115-a may receive multiple transmit power configurations in multiple sTTIs used to configure the same SRS transmission. In one example, UE 115-a may determine the configuration for an SRS transmission based on an accumulation of the parameters received in the multiple transmit power configurations.

In another example, UE 115-a may determine the configuration for an SRS based on one of the transmit power configurations received in the multiple sTTIs. For instance, UE 115-a may determine the configuration for the SRS based on the configuration that indicates the highest transmit power or the configuration that indicates the lowest transmit power. Further, UE 115-a may determine the configuration for the SRS based on an average of the transmit powers indicated in the multiple transmit power configurations. In yet another example, the multiple transmit power configurations may be the same, and UE 115-a may determine the configuration for an SRS transmission based on the single transmit power configuration.

In some cases, the SRS transmitted by UE 115-a may be a periodic SRS 220 for channel estimation for different types of communications. In such cases, UE 115-a may determine a transmit power for periodic SRS transmissions corresponding to a certain type of communications based on the configuration associated with that type of communications. In addition to the parameters for determining the transmit power for SRS transmissions, base station 105-a may configure UE 115-a with a different periodicity, subframe offset, SRS bandwidth, etc. for different types of communications. Further, base station 105-a may configure the subframe offsets for SRS transmissions associated with different type of communications to avoid colliding SRS transmissions within a subframe.

In other cases, the SRS transmitted by UE 115-a may be an aperiodic SRS 220. In such cases, base station 105-a may transmit a grant (e.g., uplink or downlink grant) to trigger an SRS transmission from UE 115-a. Accordingly, when UE 115-a receives a grant triggering an SRS transmission for MBB communications, UE 115-a may determine a configuration (e.g., transmit power) for the SRS transmission based on the parameters configured for SRS transmissions associated with MBB communications. Similarly, when UE 115-a receives a grant triggering an SRS transmission for low latency communications, UE 115-a may determine a configuration (e.g., transmit power) for the SRS transmission based on the parameters configured for SRS transmissions associated with low latency communications.

Figure 3:
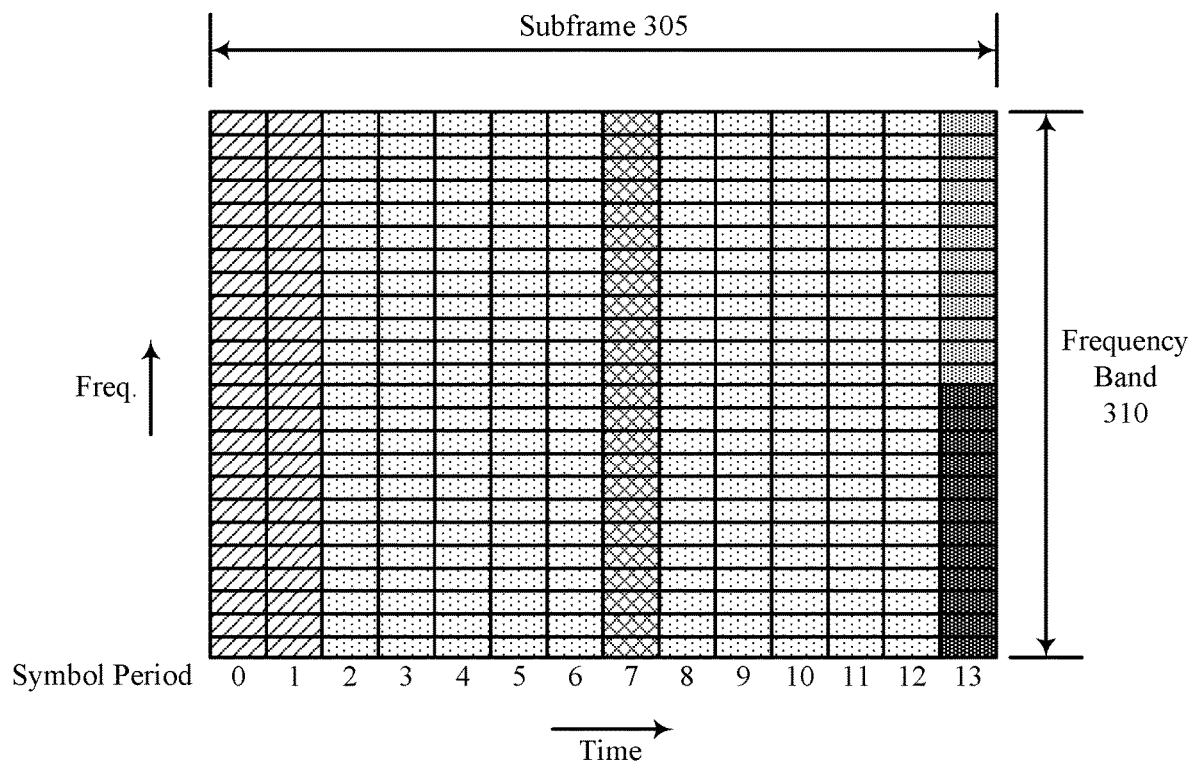
FIG. 3 illustrates an example of an SRS collision in a system that supports SRS configuration and TBS scaling in low latency systems in accordance with aspects of the present disclosure.
Figure 3:
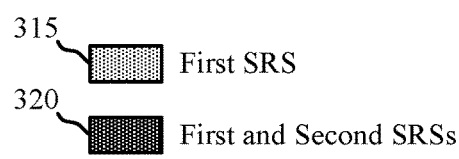

FIG. 3 illustrates an example of an SRS collision in resource blocks 300 in a system that supports SRS configuration and TBS scaling in low latency systems in accordance with various aspects of the present disclosure. As illustrated, a UE 115 may be configured to transmit multiple SRS transmissions simultaneously (e.g., multiple aperiodic SRSs, multiple periodic SRSs, or multiple aperiodic and periodic SRSs). Specifically, a UE 115 may be configured to transmit a first SRS 315 for MBB communications over a frequency band 310 and a second SRS (overlapping with the first SRS 315) 320 for low latency communications over a portion of frequency band 310 in symbol 13 of a subframe 305. In such cases, the SRS transmissions for the different types of communications may collide (e.g., across one carrier or multiple carriers). The techniques described herein allow a UE 115 to handle collisions of SRS transmissions.

Specifically, base station 105 may configure UE 115 to determine which (if any) SRS to transmit when there is a collision of SRS transmissions. In one example, base station 105 may transmit an indication of different priorities associated with SRS transmissions for different types of communications to UE 115. Accordingly, when UE 115 identifies a collision of SRS transmissions, UE 115 may be able to determine which SRS to transmit. For example, if a transmission of the second SRS 320 for low latency communications is associated with a higher priority than a transmission of the first SRS 315 for MBB communications, UE 115 may transmit the second SRS 320 for low latency communications and refrain from transmitting the first SRS 315 for MBB communications.

UE 115 may also determine which (if any) SRS to transmit based on other factors. For example UE 115 may determine which (if any) SRS to transmit based on a power constraint at the UE 115, an extent to which the bandwidth for each SRS transmission overlaps, etc. In some examples, if UE 115 identifies that it has a power constraint and/or that the bandwidths for the different SRS transmissions overlap (as shown), UE 115 may determine to refrain from transmitting one of the SRSs (e.g., based on the priority of the different SRS transmissions). In other examples, if UE 115 determines that it does not have a power constraint and/or the bandwidths for the different SRS transmissions do not overlap (not shown), UE 115 may determine to transmit both SRSs. In yet other examples, if UE 115 determines that the SRS transmissions collide within one subframe of a carrier, UE 115 may determine to refrain from transmitting both SRSs.

Further, if UE 115 identifies that the first SRS 315 (e.g., 1 ms SRS) collides with the second SRS 320 (e.g., sTTI SRS) on the same cell, UE 115 may drop the first SRS 315 or the second SRS 320 (e.g., based on comparing the priority of the first SRS 315 and second SRS 320 or based on a configuration at the UE 115). In some cases, if UE 115 identifies that the first SRS 315 collides with the second SRS 320 on different cells, and UE 115 is not capable of simultaneous SRS transmissions, UE 115 may drop the first SRS 315 or the second SRS 320. In other cases, if UE 115 identifies that the first SRS collides with the second SRS 320 on different cells, and UE 115 is capable of simultaneous SRS transmission, but UE 115 is power limited, UE 115 may drop the first SRS 315 or the second SRS 320. Additionally, in some aspects, UE 115 may determine whether to drop the first SRS 315 or the second SRS 320 based on whether the first SRS 315 is a type 0 SRS (e.g., a periodic or single SRS) or a type 1 SRS (e.g., an aperiodic SRS).

In some cases, if UE 115 identifies that the first SRS 315 (e.g., 1 ms SRS) is scheduled to be transmitted in one number of symbols (e.g., 4 symbols) and the first SRS 315 collides with the second SRS 320 (e.g., sTTI SRS or sSRS) scheduled to be transmitted in a different number of symbols (e.g., 2 symbols), the UE 115 may use the techniques described herein to determine whether to drop the first SRS 315 or a portion of the first SRS 315 or drop the second SRS 320 or a portion of the second SRS 320. For example, when a portion of the symbols allocated for transmitting the first SRS 315 overlaps with the symbols allocated for transmitting the second SRS 320, UE 115 may be configured to either drop the transmission of the first SRS 315 in the overlapping symbols, drop the transmission of the first SRS 315 in all symbols, or drop the transmission of the second SRS 320. Alternatively, when a portion of the symbols allocated for transmitting the second SRS 320 overlaps with the symbols allocated for transmitting the first SRS 315, UE 115 may be configured to either drop the transmission of the second SRS 320 in the overlapping symbols, drop the transmission of the second SRS 320 in all symbols, or drop the transmission of the first SRS 315.

Figure 4:
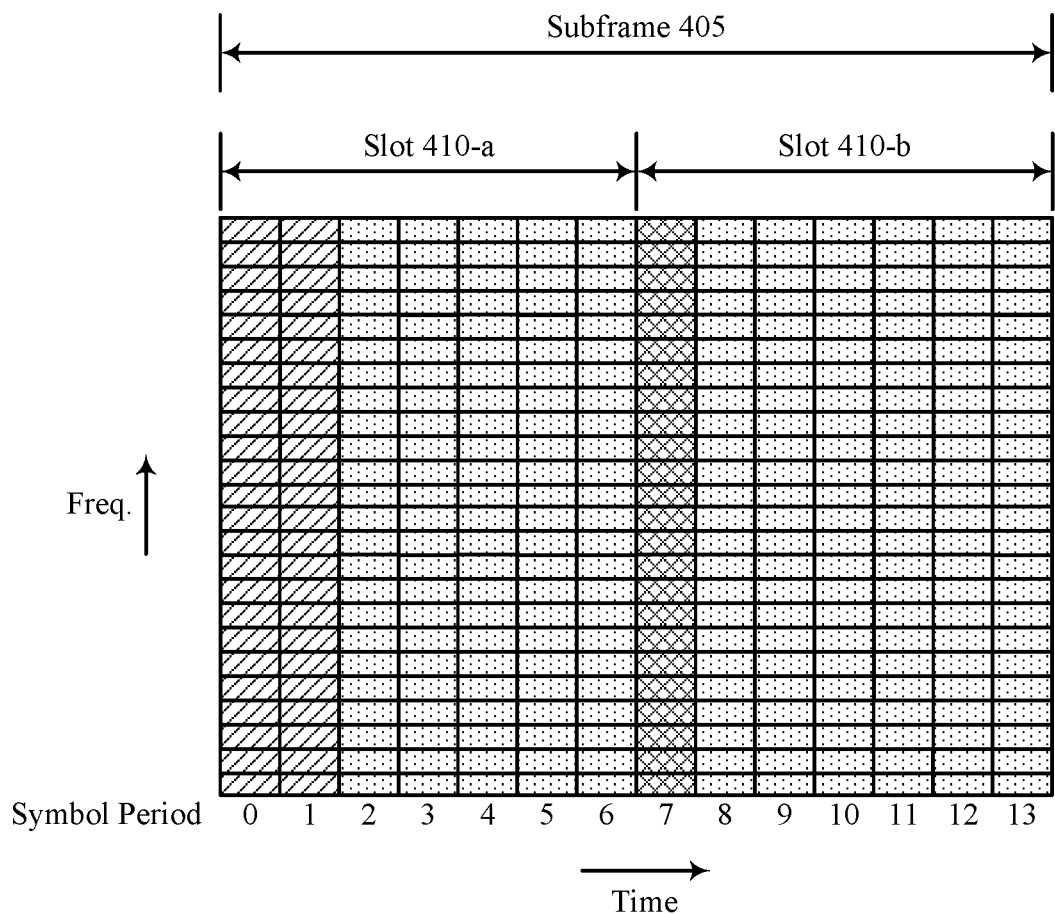
FIG. 4 illustrates an example of resource blocks used to transmit a transport block in a system that supports SRS configuration and TBS scaling in low latency systems in accordance with aspects of the present disclosure.

FIG. 4 illustrates an example of resource blocks 400 used to transmit a transport block in a system that supports SRS configuration and TBS scaling in low latency systems in accordance with various aspects of the present disclosure. Specifically, resource blocks 400 may be used for control and data signaling in a wireless communications system. The wireless communications system may support the techniques described herein for determining a TBS for a data transmission. In some cases, the TBS may be determined based on a TBS index that corresponds to a TBS in a TBS table. The TBS index may be determined based on a function of a modulation and coding scheme (MCS) and a number of resource blocks to be used for a data transmission. Using the techniques described herein, a device (e.g., base station 105 or UE 115) may be able to determine an appropriate number of resources blocks available for a data transmission, and the device may use this information to determine an appropriate TBS.

Using the techniques described herein, a base station 105 and UE 115 may determine the number of resource blocks available for a low latency transmission based on the overhead in an sTTI 410 (e.g., a one slot sTTI 410). In some cases, a first portion (e.g., two symbols) of a first slot 410-a of a subframe 405 (e.g., slot 0 of a subframe) may be allocated for control information for MBB communications (e.g., as a PDCCH 415) and the resource blocks within this portion may be unavailable for a transmission of data 425. Accordingly, a device may determine a number of resource blocks available for the transmission of the data 425 based on the number of resource blocks within the remaining portion of the sTTI 410-a.

In some cases, the number of symbols allocated as a PDCCH 415 may vary across TTIs. In such cases, a device may determine that a default number of symbols are allocated for PDCCH, and the device may determine the number of resource blocks available for the transmission of data 425 based on the default overhead. Specifically, if the default number of symbols allocated for PDCCH 415 is two (2) (e.g., symbols 0 and 1), the device may determine that the remaining five (5) symbols in a slot 410-a are available for a data transmission based, for example, on the following equation:

$$\text{RBs} = \max(\lfloor \text{scaling factor} \cdot \text{RBs}_{subframe}/14 \rfloor, 1) \quad (2)$$

where $\text{RBs}_{subframe}$ corresponds to the number of resource blocks within a subframe, and the scaling factor corresponds to five (5) in the previous example. In other examples, the device may determine the number of resource blocks available for data in the slot (or sTTI) based on the following equation:

$$\text{RBs} = \max(\lfloor \text{scaling factor} \cdot \text{RBs}_{slot_{sTTI}}/7 \rfloor, 1) \quad (3)$$

where $\text{RBs}_{slot_{sTTI}}$ corresponds to the number of resource blocks within a slot (or sTTI), and the scaling factor corresponds to five (5) in the previous example. The device may then determine a TBS for a transport block based on the number of resource blocks available for data (e.g., using the TBS table described above).

Additionally, the first portion of a second slot 410-b of a subframe 405 (e.g., slot 1 of a subframe) may be allocated for control information for low latency communications (e.g., as an sPDCCH 420), and the resource blocks within this portion may be unavailable for a transmission of data 425. Accordingly, a device may determine a number of resource blocks available for the transmission of data 425 based on the number of resource blocks within the remaining portion of the sTTI 410-b. As such, the scaling factor described above may be determined based on the number of symbols allocated for the sPDCCH 420 (e.g., six (6) for one-symbol sPDCCH and five (5) for two-symbol sPDCCH). Alternatively, the device may determine that a default number of symbols (e.g., one) are allocated for sPDCCH 420, and the device may determine the number of resource blocks available based on the default overhead.

In addition to determining the number of resource blocks available for a transmission of data 425 based on the control overhead, a device may determine the number of resource blocks based on a transmission mode (TM) to be used for the transmission of the data 425 (e.g., based on a reference signal overhead). For example, if a CRS-based TM is to be used for the transmission of the data 425, the device may determine the number of resource blocks available for the data transmission based on the number of resource elements used to transmit CRS in a resource block. Alternatively, if a DMRS-based TM is to be used for the transmission of the data 425, the device may determine the number of resource blocks available for the data transmission based on the number of resource elements used to transmit DMRS in a resource block. The techniques described herein for determining the TBS may apply to both LTE-FDD and to downlink and uplink subframes in LTE-TDD.

Further, although the examples described with reference to FIG. 4 are related to determining a TBS for a transport block to be transmitted in a one slot sTTI (e.g., slot 410-a or slot 410-b), the techniques described above also apply to determining a TBS for a transport block to be transmitted in a two-symbol sTTI or a three-symbol sTTI. For a two-symbol sTTI, a device may determine the number of symbols available for data (e.g., based on the number of symbols used for control information or reference signal transmissions), and the device may determine the TBS for a transport block to be transmitted in the two-symbol sTTI based on the number of symbols available for data in the two-symbol sTTI. Similarly, for a three-symbol sTTI, a device may determine the number of symbols available for data (e.g., based on the number of symbols used for control information or reference signal transmissions), and the device may determine the TBS for a transport block to be transmitted in the three-symbol sTTI based on the number of symbols available for data in the three-symbol sTTI.

Figure 5:
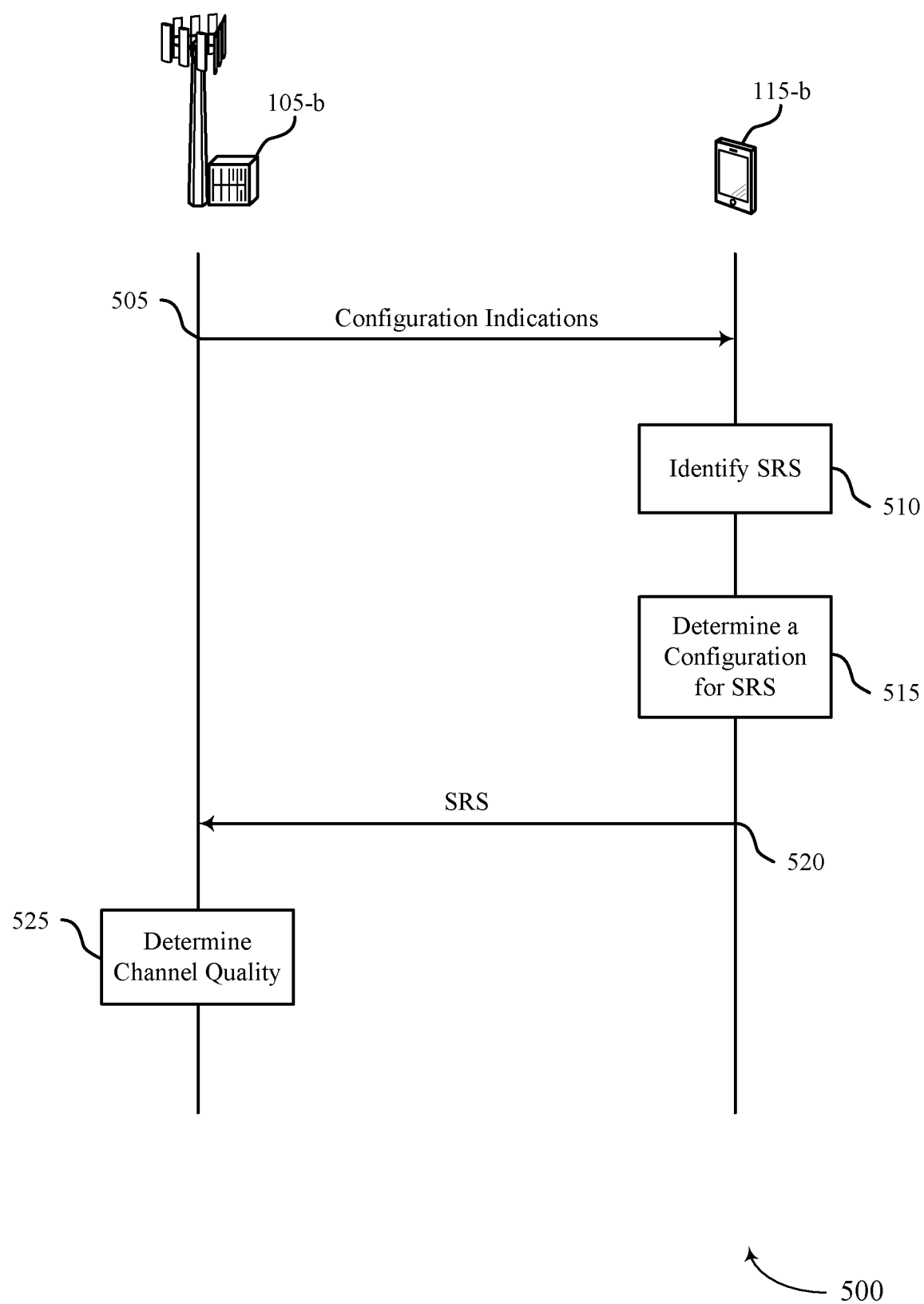
FIG. 5 illustrates an example of a process flow that supports SRS configuration and TBS scaling in low latency systems in accordance with aspects of the present disclosure.

FIG. 5 illustrates an example of a process flow 500 that supports SRS configuration and TBS scaling in low latency systems in accordance with various aspects of the present disclosure. In some examples, process flow 500 may implement aspects of wireless communications systems 100 and 200. Process flow 500 includes a base station 105-b and a UE 115-b, which may be examples of the corresponding devices described with reference to FIGS. 1 and 2. Base station 105-b and UE 115-b may communicate during TTIs having a first TTI duration (e.g., for low latency communications) and TTIs having a second TTI duration (e.g., for MBB communications).

At 505, base station 105-b may transmit an indication of a first configuration for SRS transmissions during TTIs having the first TTI duration and an indication of a second configuration for SRS transmissions during TTIs having the second TTI duration. In one example, base station 105-b may transmit downlink control information (DCI) or short DCI (sDCI) messages with TPC commands to establish a power control adjustment state for SRS transmissions in the respective TTIs. Similarly, base station 105-b may signal the $M_{SRS}$ parameter noted above to indicate SRS bandwidths for the different TTIs for use with open loop power control. UE 115-b may receive the indication of the first configuration for SRS transmissions during TTIs having the first TTI duration and the indication of the second configuration for SRS transmissions during TTIs having the second TTI duration and may track and maintain them separately.

At 510, UE 115-b may identify an SRS to be transmitted during a TTI (e.g., based on receiving a grant from base station 105-b). At 515, UE 115-b may determine a configuration for the SRS based on the TTI having either the first TTI duration or the second TTI duration. For example, UE 115-*b* may determine a configuration for the SRS based on the SRS transmission being scheduled in a PUSCH (or another channel without uplink data (e.g., when the SRS transmission is triggered by a downlink grant)) or an sPUSCH (or another shortened channel without uplink data (e.g., when the SRS transmission is triggered by a downlink grant)). Additionally, or alternatively, UE 115-*b* may determine a configuration for the SRS based on the TTI in which the grant was received having either the first TTI duration or the second TTI duration. For example, if an aperiodic SRS is identified based on an sDCI trigger in an sPDCCH or an sDCI trigger in a PDCCH (e.g., where the PDCCH overlaps with an sPDCCH, such as in the first slot of a subframe, and where the sDCI has a different format from DCI in the PDCCH), then UE 115-*b* may use the first SRS configuration, whereas if an aperiodic SRS is identified based on a DCI trigger in a PDCCH, the UE 115-*b* may utilize the second SRS configuration.

Similarly, if a periodic SRS is to be transmitted for a particular TTI or type of service (e.g., a low latency service), UE 115-*b* may use the corresponding SRS configuration to determine a transmit power and other configurations for the SRS transmission. In some cases, the configuration for the SRS may be determined based on the configuration indications received at 505. In some examples, UE 115-*b* may determine a transmit power configuration for the SRS according to the first configuration when the TTI has the first TTI duration and according to the second configuration when the TTI has the second TTI duration. UE 115-*b* may receive at least one of a closed-loop power parameter or a set of open-loop power parameters corresponding to the TTI having either the first TTI duration or the second TTI duration.

UE 115-*b* may then use the closed-loop power parameter and the open-loop power parameter to determine the transmit power configuration. In some cases, the closed-loop power parameter is a power control adjustment state corresponding to the TTI having either the first TTI duration or the second TTI duration. The set of open-loop parameters may include a maximum transmit power, an SRS offset, or a bandwidth used to transmit the SRS, or a combination thereof, corresponding to the TTI having either the first TTI duration or the second TTI duration.

In some examples, UE 115-*b* may identify a collision between a first SRS transmission during a first TTI having the first TTI duration and a second SRS transmission during a second TTI having the second TTI duration. Accordingly, the UE 115-*b* may determine whether to transmit the first SRS, second SRS, no SRS, or both SRSs. The configuration indications received at 505 may indicate a first priority for SRS transmissions during TTIs having the first TTI duration and a second priority for SRS transmissions during TTIs having the second TTI duration. Accordingly, the UE 115-*b* may determine whether to transmit the first SRS, the second SRS, or both based on comparing the first priority to the second priority.

In some cases, UE 115-*b* may determine whether to transmit the first SRS, the second SRS, or both based at least in part on a power constraint. Further, UE 115-*b* may determine whether to transmit the first SRS, the second SRS, or both based at least in part on whether a first bandwidth associated with the first SRS overlaps with a second bandwidth associated with the second SRS. In some examples, UE 115-*b* may transmit the first SRS and the second SRS simultaneously. In other examples, UE 115-*b* may refrain from transmitting the first SRS and the second SRS.

At 520, UE 115-*b* may transmit the SRS based at least in part on the determined configuration. At 525, after receiving the SRS at 520, base station 105-*b* may determine a channel quality of a channel used to transmit data during the TTI based on the SRS. Based on the channel quality (or channel quality estimates), base station 105-*b* may allocate resources associated with a high quality to UE 115-*b* for uplink transmissions. Thus, because SRSs scheduled to be transmitted during TTIs having different durations associated with different types of communications may be triggered differently and transmitted using different configurations, the SRS transmissions may be reliable and efficient.

In addition to the techniques described above for supporting efficient SRS transmissions, UE 115-*b* may use other techniques described herein to determine a TBS for uplink transmissions during a TTI to base station 105-*b*. Specifically, UE 115-*b* may identify data to transmit during a TTI having the first TTI duration, determine a number of resource elements available for transmission of the data during the TTI having the first TTI duration, and determine a TBS for transmission of the data during the TTI having the first TTI duration based on the determined number of resource elements available for transmission of the data during the TTI.

In some cases, UE 115-*b* may determine the number of resource elements available by identifying a number of resource elements within the TTI having the first TTI duration that are reserved for control information in a control channel (e.g., PDCCH) associated with communications during a TTI having the second TTI duration. In an example, UE 115-*b* may identify a default number of resource elements within the TTI having the first TTI duration that are reserved for control information. In other cases, UE 115-*b* may determine the number of resource elements available by identifying a number of resource elements within the TTI having the first TTI duration that are reserved for control information in a control channel (e.g., sPDCCH) associated with communications during a TTI having the first TTI duration.

Additionally, UE 115-*b* may determine whether a TM used for communications during the TTI having the first TTI duration is CRS-based or DMRS-based, and UE 115-*b* may determine the TBS for the transmission based on determining whether the TM is CRS-based or DMRS-based. Although the techniques described above are described from the perspective of UE 115-*b* determining a TBS for a transmission, base station 105-*b* (and other devices) may apply the techniques described above to determine a TBS for a transmission.

Figure 6:
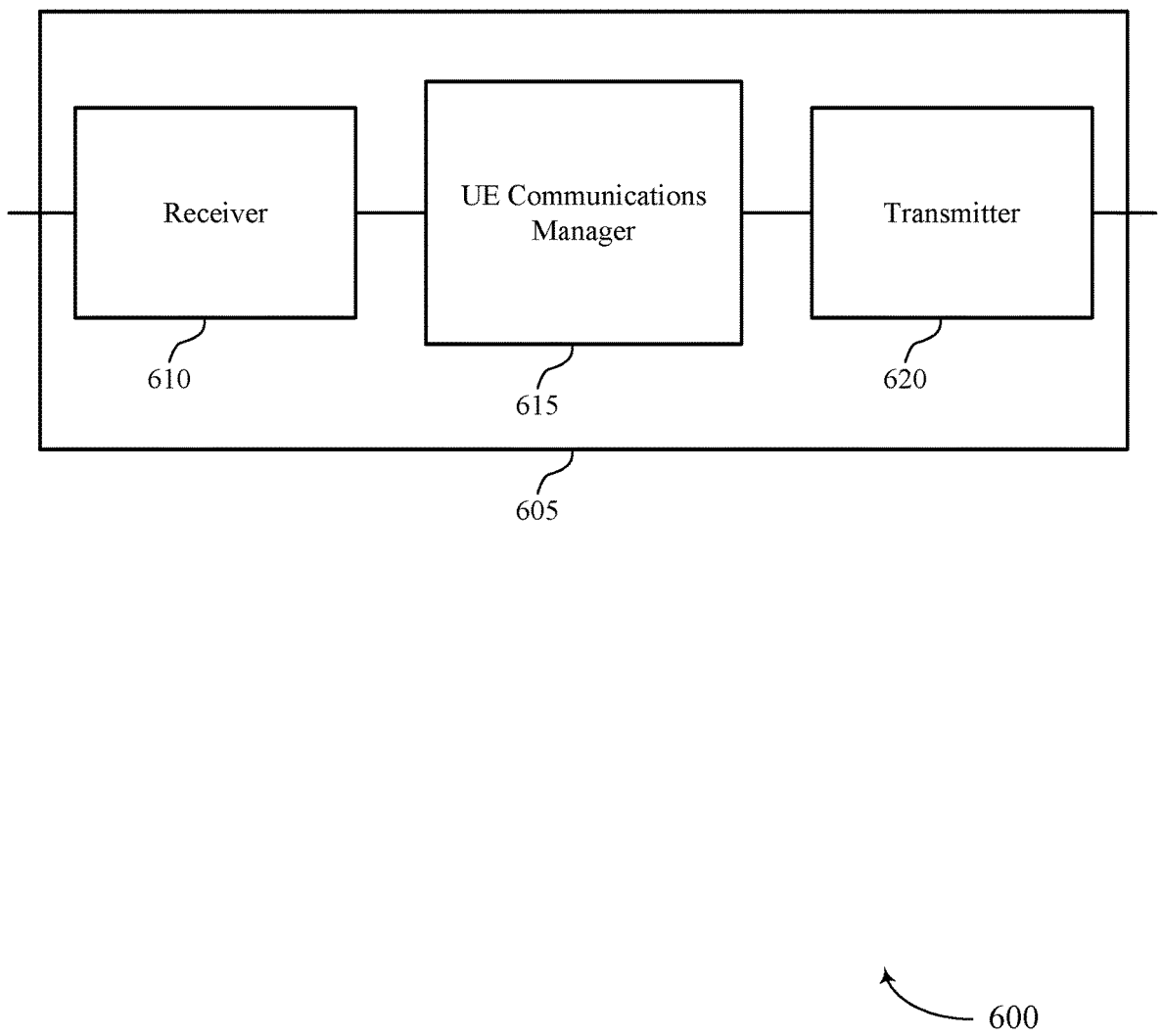
FIGS. 6-8 show block diagrams of a device that supports SRS configuration and TBS scaling in low latency systems in accordance with aspects of the present disclosure.

FIG. 6 shows a block diagram 600 of a wireless device 605 that supports SRS configuration and TBS scaling in low latency systems in accordance with various aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to SRS configuration and TBS scaling in low latency systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

In some examples, the UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a grant in DCI or sDCI, identify an SRS to be transmitted based at least in part on receiving the grant, and determine a configuration for the SRS based on the grant being received in the DCI or the sDCI. UE communications manager 615 may then coordinate with transmitter 620 to transmit the SRS during a TTI having the first TTI duration or a TTI having the second TTI duration based on the configuration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
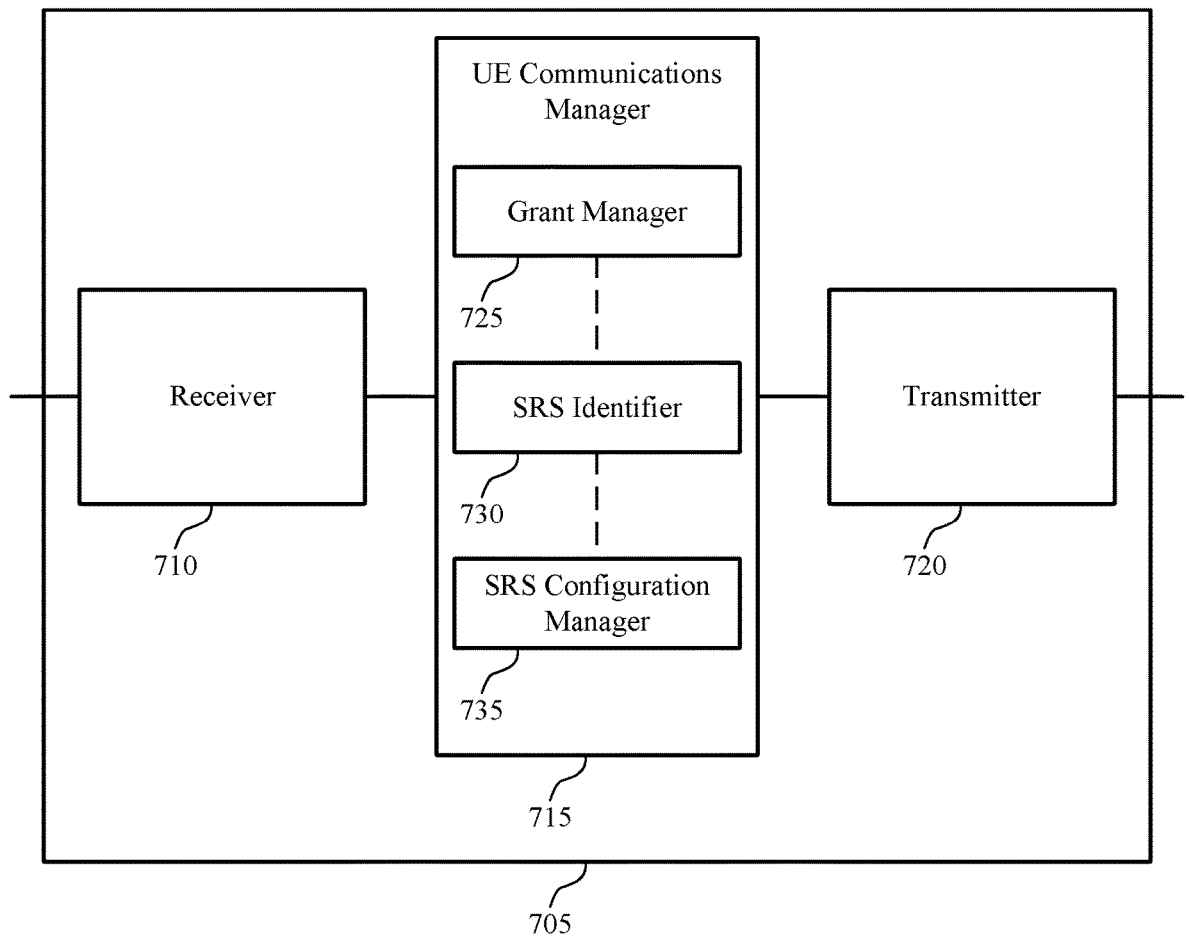

FIG. 7 shows a block diagram 700 of a wireless device 705 that supports SRS configuration and TBS scaling in low latency systems in accordance with various aspects of the present disclosure. Wireless device 705 may be an example of aspects of a wireless device 605 or a UE 115 as described with reference to FIG. 6. Wireless device 705 may include receiver 710, UE communications manager 715, and transmitter 720. UE communications manager 715 may be an example of aspects of the UE communications manager 915 described with reference to FIG. 9. UE communications manager 715 may include grant manager 725, SRS identifier 730, and SRS configuration manager 735. Wireless device 705 may also include a processor. Each of these components may be in communication with one another (e.g., via one or more buses).

Receiver 710 may receive information such as packets, user data, or control information associated with various information channels (e.g., control channels, data channels, and information related to SRS configuration and TBS scaling in low latency systems, etc.). Information may be passed on to other components of the device. The receiver 710 may be an example of aspects of the transceiver 935 described with reference to FIG. 9. The receiver 710 may utilize a single antenna or a set of antennas.

Grant manager 725 may receive a grant in DCI or sDCI. SRS identifier 730 may identify an SRS to be transmitted during a TTI. In some cases, the SRS includes a periodic SRS. In some cases, the SRS includes an aperiodic SRS. SRS configuration manager 735 may determine a configuration for the SRS based on the grant being received in the DCI or the sDCI. UE communications manager 715 may then coordinate with transmitter 720 to transmit the SRS during a TTI having the first TTI duration or a TTI having the second TTI duration based at least in part on the configuration.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
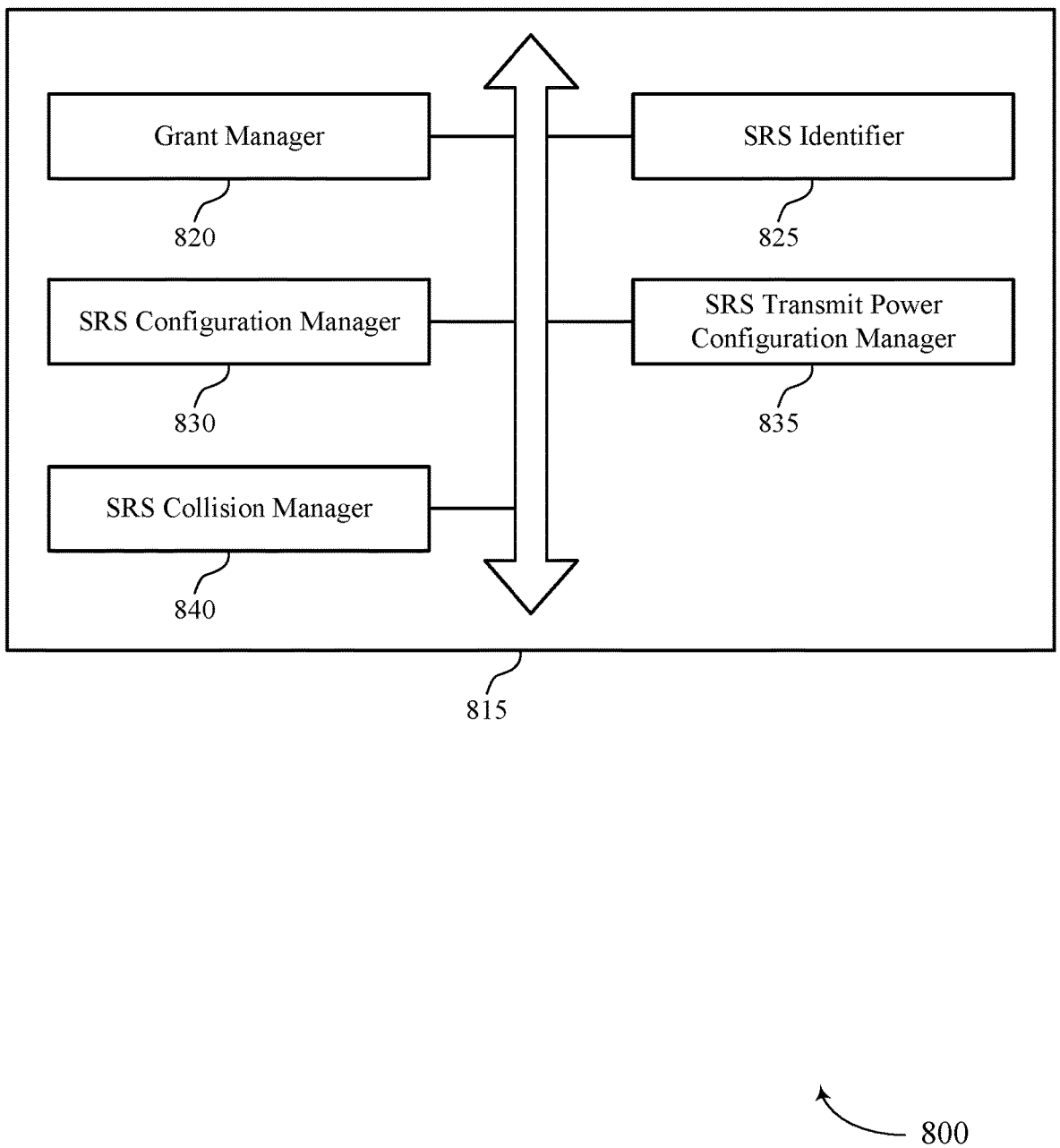

FIG. 8 shows a block diagram 800 of a UE communications manager 815 that supports SRS configuration and TBS scaling in low latency systems in accordance with various aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include grant manager 820, SRS identifier 825, SRS configuration manager 830, SRS transmit power configuration manager 835, and SRS collision manager 840. Each of these modules may communicate, directly or indirectly, with one another (e.g., via one or more buses).

Grant manager 820 may receive a grant in DCI or sDCI. SRS identifier 825 may identify an SRS to be transmitted during a TTI. In some cases, the SRS includes an aperiodic SRS. SRS configuration manager 830 may determine a configuration for the SRS based on the grant being received in the DCI or the sDCI. In some cases, SRS configuration manager 830 may determine the configuration for the SRS based at least in part on the grant being received in a PDCCH or an sPDCCH. In some cases, SRS configuration manager 830 may determine the configuration for the SRS based at least in part on the SRS being scheduled to be transmitted in the TTI having the first TTI duration or the TTI having the second TTI duration. UE communications manager 815 may then coordinate with a transmitter to transmit the SRS during a TTI having the first TTI duration or a TTI having the second TTI duration based at least in part on the configuration.

In some cases, SRS configuration manager 830 may receive an indication of a first configuration for SRS transmissions during TTIs having the first TTI duration and an indication of a second configuration for SRS transmissions during TTIs having the second TTI duration, where the configuration for the SRS is determined based on the received indications. In some cases, SRS transmit power configuration manager 835 may determine a transmit power configuration for the SRS according to the first configuration when the SRS is scheduled to be transmitted in the TTI having the first TTI duration and according to the second configuration when the SRS is scheduled to be transmitted in the TTI having the second TTI duration.

In some cases, determining the transmit power configuration for the SRS includes receiving one or more open-loop power parameters corresponding to the SRS being scheduled to be transmitted in the TTI having the first TTI duration or the TTI having the second TTI duration and selecting a closed-loop parameter corresponding to the SRS being scheduled to be transmitted in the TTI having the first TTI duration or the TTI having the second TTI duration. In some cases, the closed-loop power parameter is a power control adjustment state corresponding to the SRS being scheduled to be transmitted in the TTI having the first TTI duration or the TTI having the second TTI duration. In some cases, the one or more open-loop power parameters include a maximum transmit power, an SRS offset, or a bandwidth used to transmit the SRS, or a combination thereof, corresponding to the SRS being scheduled to be transmitted in the TTI having the first TTI duration or the TTI having the second TTI duration. In some cases, the SRS includes a periodic SRS. In some cases, the configuration includes an SRS periodicity, a subframe offset, or a bandwidth, or a combination thereof, corresponding to the SRS being scheduled to be transmitted in the TTI having the first TTI duration or the TTI having the second TTI duration.

In some cases, the SRS includes an aperiodic SRS. In some cases, receiving the grant in DCI or sDCI includes receiving the grant in sDCI, where the SRS is transmitted according to the configuration corresponding to the TTI having the first TTI duration based on receiving the grant in sDCI. In some cases, receiving the grant in the control region of the TTI having the first TTI duration or the second TTI duration includes receiving the grant in DCI, where the SRS is transmitted according to the configuration corresponding to the TTI having the second TTI duration based on receiving the grant in DCI.

In some cases, SRS transmit power configuration manager 835 may receive multiple transmit power configurations during multiple TTIs for the SRS to be transmitted during the TTI having the first TTI duration or the TTI having the second TTI duration, and determine the configuration for the SRS based at least in part on one or more of the multiple transmit power configurations. In some cases, determining the configuration for the SRS based at least in part on one or more of the multiple transmit power configurations includes determining the configuration for the SRS based at least in part on an accumulation of the multiple transmit power configurations.

In some cases, determining the configuration for the SRS based at least in part on one or more of the multiple transmit power configurations includes determining the configuration for the SRS based at least in part on a highest or lowest transmit power indicted in one of the multiple transmit power configurations. In some cases, determining the configuration for the SRS based at least in part on one or more of the multiple transmit power configurations includes determining the configuration for the SRS based at least in part on an average of transmit powers indicated in the multiple transmit power configurations. In some cases, the multiple transmit power configurations indicate a same transmit power configuration to be used to transmit the SRS.

SRS collision manager 840 may identify a collision between a first SRS transmission during a first TTI having the first TTI duration and a second SRS transmission during a second TTI having the second TTI duration. In some cases, the first SRS transmission and the second SRS transmission are scheduled on a same carrier or on different carriers. In some cases, the configuration indicates a first priority for SRS transmissions during TTIs having the first TTI duration and a second priority for SRS transmissions during TTIs having the second TTI duration. In some cases, SRS collision manager 840 may determine whether to transmit the first SRS, the second SRS, or both based on comparing the first priority to the second priority, transmit the first SRS and the second SRS simultaneously, and refrain from transmitting the first SRS and the second SRS. In some cases, determining whether to transmit the first SRS, the second SRS, or both includes determining whether to transmit the first SRS, the second SRS, or both based on a power constraint. In some cases, determining whether to transmit the first SRS, the second SRS, or both includes determining whether to transmit the first SRS, the second SRS, or both based on whether a first bandwidth associated with the first SRS overlaps with a second bandwidth associated with the second SRS. In some cases, SRS collision manager 840 may coordinate with a transmitter to transmit the first SRS and the second SRS simultaneously or refrain from transmitting the first SRS and the second SRS.

Figure 9:
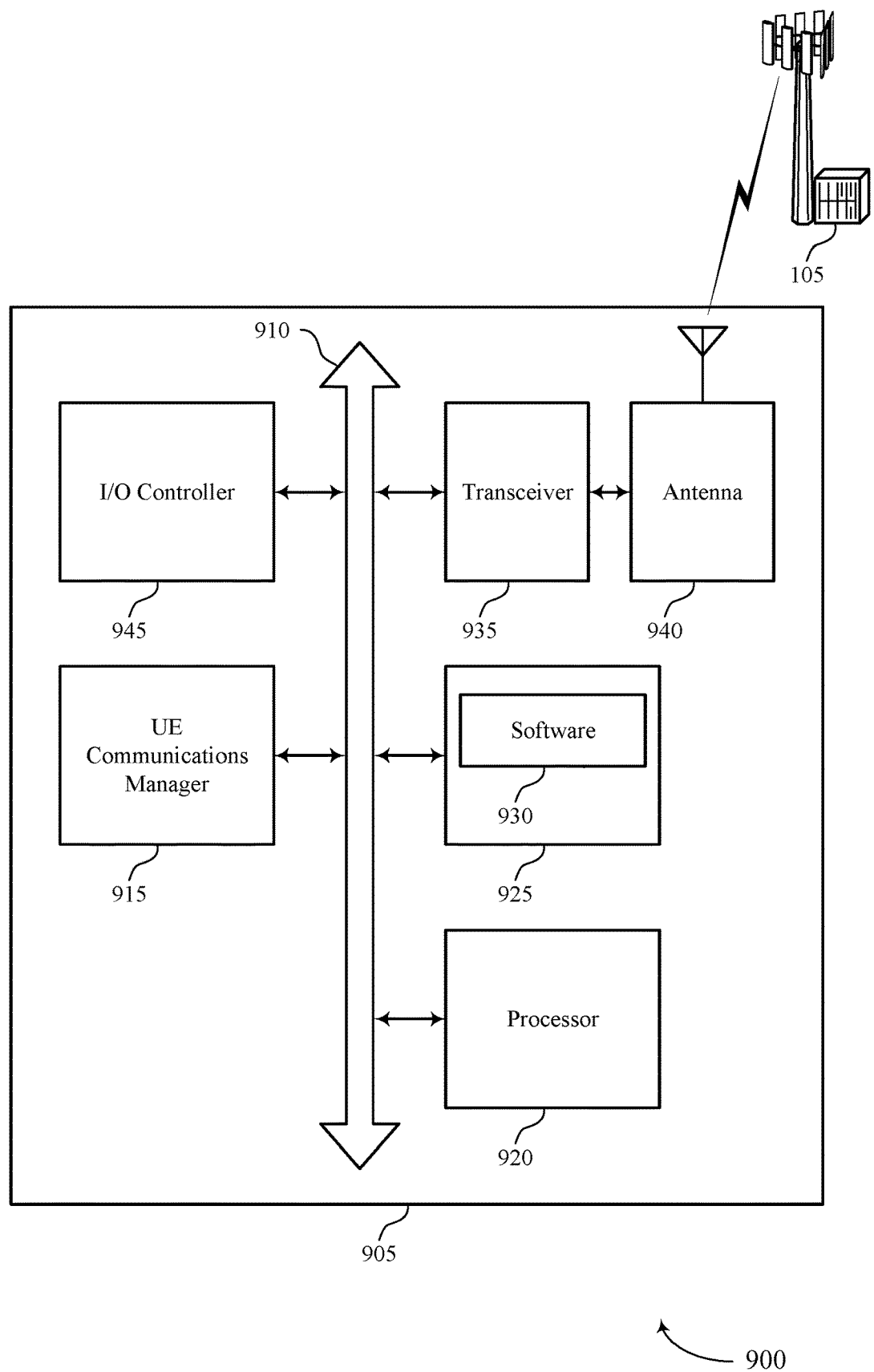
FIG. 9 illustrates a block diagram of a system including a user equipment (UE) that supports SRS configuration and TBS scaling in low latency systems in accordance with aspects of the present disclosure.

FIG. 9 shows a diagram of a system 900 including a device 905 that supports SRS configuration and TBS scaling in low latency systems in accordance with various aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting SRS configuration and TBS scaling in low latency systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support SRS configuration and TBS scaling in low latency systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
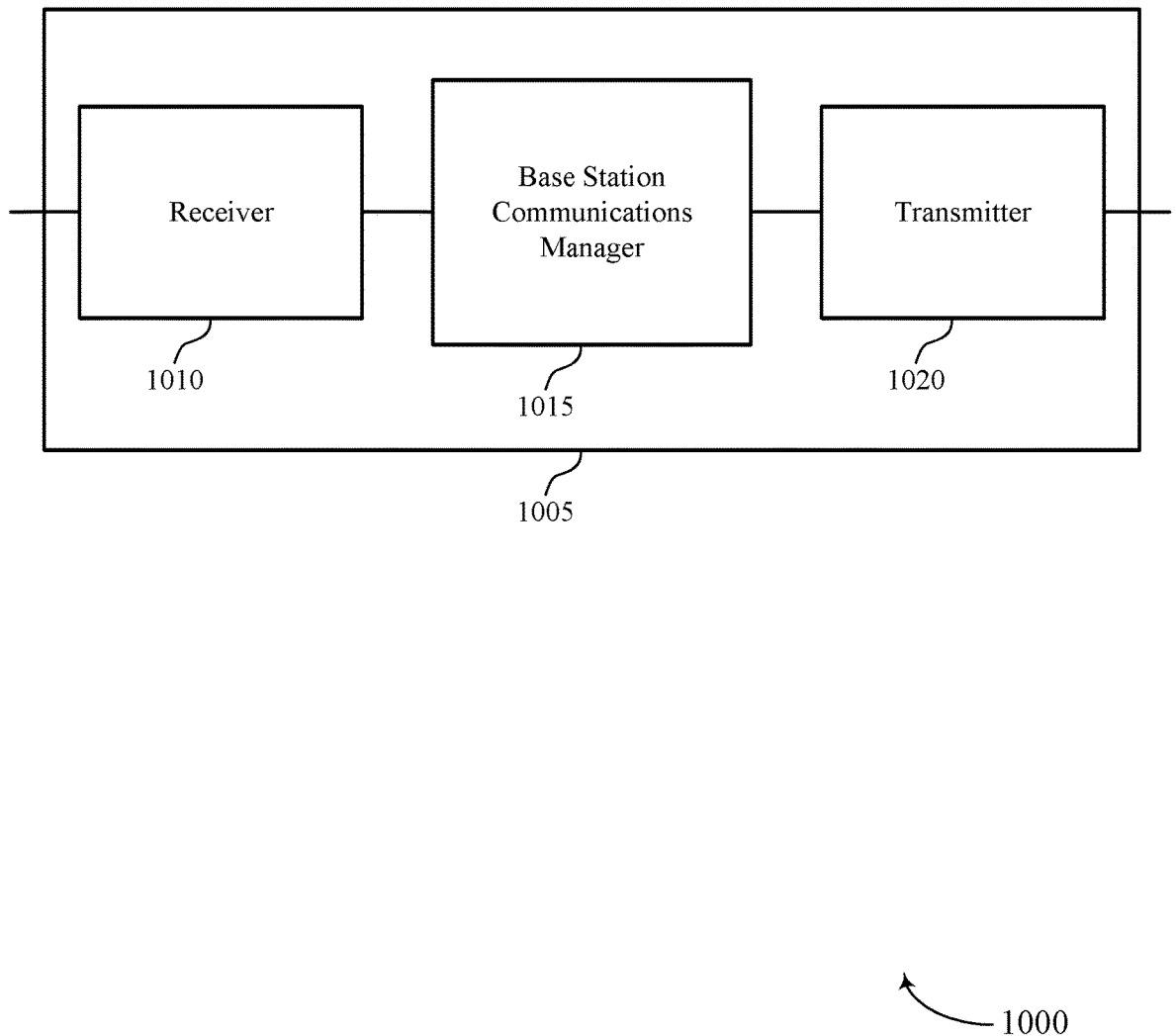
FIGS. 10 and 11 show block diagrams of a device that supports SRS configuration and TBS scaling in low latency systems in accordance with aspects of the present disclosure.

FIG. 10 shows a block diagram 1000 of a wireless device 1005 that supports SRS configuration and TBS scaling in low latency systems in accordance with various aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to SRS configuration and TBS scaling in low latency systems, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

In some examples, the base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure.

In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit an indication of a first configuration for SRS transmissions during TTIs having the first TTI duration and an indication of a second configuration for SRS transmissions during TTIs having the second TTI duration. Base station communications manager 1015 may then coordinate with receiver 1010 to receive an SRS during a TTI, where a configuration of the SRS is based on either the first configuration or the second configuration. In some cases, the SRS includes a periodic SRS. In some cases, the SRS includes an aperiodic SRS. Base station communications manager 1015 may determine at least a channel quality of a channel used to transmit data during the TTI based on the SRS.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
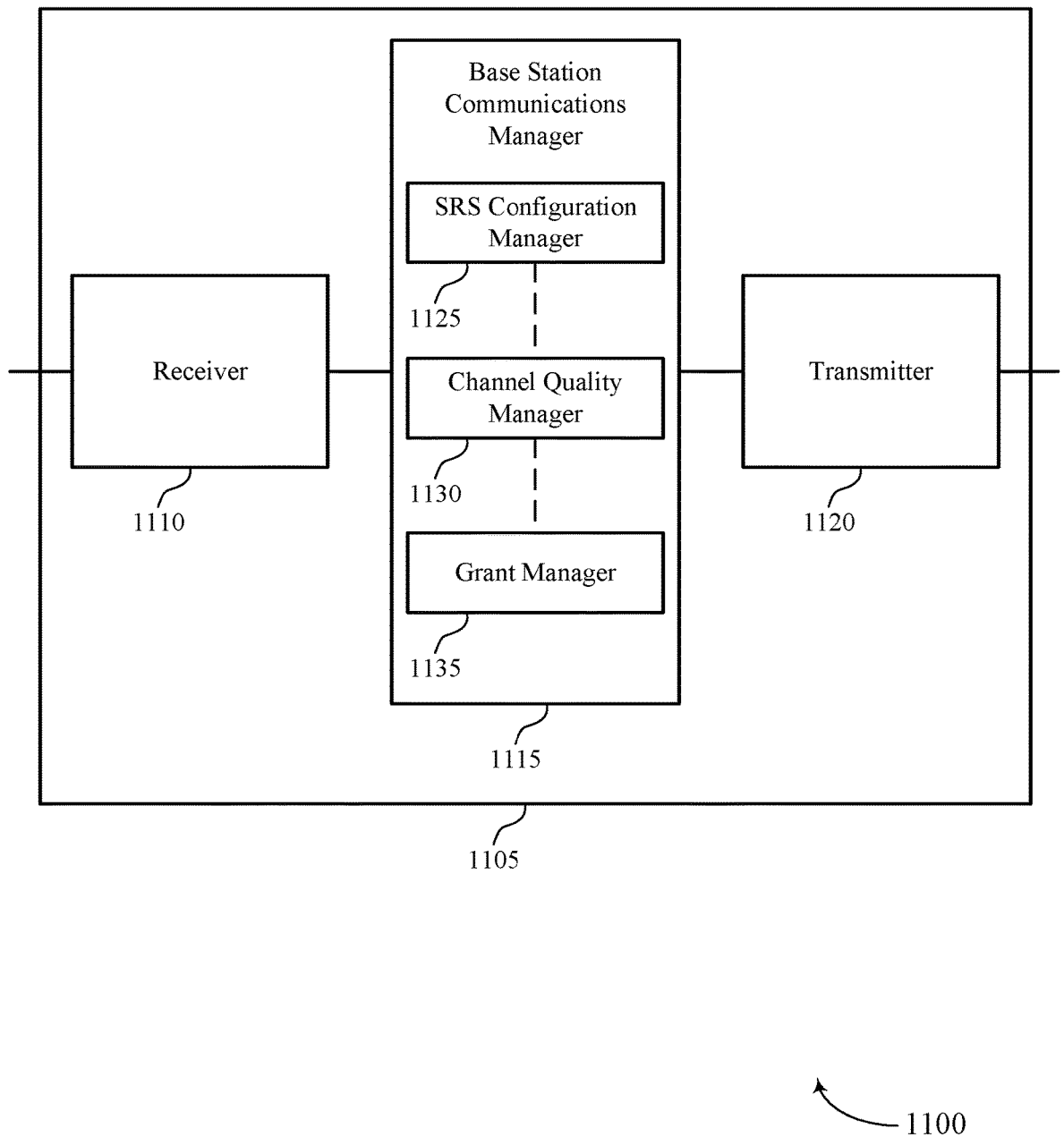

FIG. 11 shows a block diagram 1100 of a wireless device 1105 that supports SRS configuration and TBS scaling in low latency systems in accordance with various aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Base station communications manager 1115 may be an example of aspects of the base station communications manager 1215 described with reference to FIG. 12. Base station communications manager 1115 may include SRS configuration manager 1125, channel quality manager 1130, and grant manager 1135. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to SRS configuration and TBS scaling in low latency systems, etc.). Information may be passed on to other components of the device. The receiver 1110 may be an example of aspects of the transceiver 1235 described with reference to FIG. 12. The receiver 1110 may utilize a single antenna or a set of antennas.

SRS configuration manager 1125 may transmit an indication of a first configuration for SRS transmissions during TTIs having the first TTI duration and an indication of a second configuration for SRS transmissions during TTIs having the second TTI duration. Base station communications manager 1115 may then coordinate with receiver 1110 to receive an SRS during a TTI, wherein a configuration of the SRS is based at least in part on either the first configuration or the second configuration. Channel quality manager 1130 may determine at least a channel quality of a channel used to transmit data during the TTI based on the SRS.

In some cases, transmitting the indication of the first configuration and the indication of the second configuration includes transmitting one or more open-loop power parameters corresponding to the TTI having either the first TTI duration or the second TTI duration. In some cases, the one or more open-loop power parameters include a maximum transmit power, an SRS offset, or a bandwidth used to transmit the SRS, or a combination thereof corresponding to the TTI having either the first TTI duration or the second TTI duration. In some cases, the configuration of the SRS includes an SRS periodicity, a subframe offset, or a bandwidth, or a combination thereof corresponding to the TTI having either the first TTI duration or the second TTI duration.

Grant manager 1135 may transmit a grant in sDCI, where the SRS is received according to the first configuration during the TTI having the first TTI duration based on the transmitted grant. SRS configuration manager 1125 may transmit a grant in DCI, where the SRS is received according to the second configuration during the TTI having the second TTI duration based on the transmitted grant.

Transmitter 1120 may transmit signals generated by other components of the device. In some examples, the transmitter 1120 may be collocated with a receiver 1110 in a transceiver module. The transmitter 1120 may be an example of aspects of the transceiver 1235 described with reference to FIG. 12. The transmitter 1120 may utilize a single antenna or a set of antennas.

Figure 12:
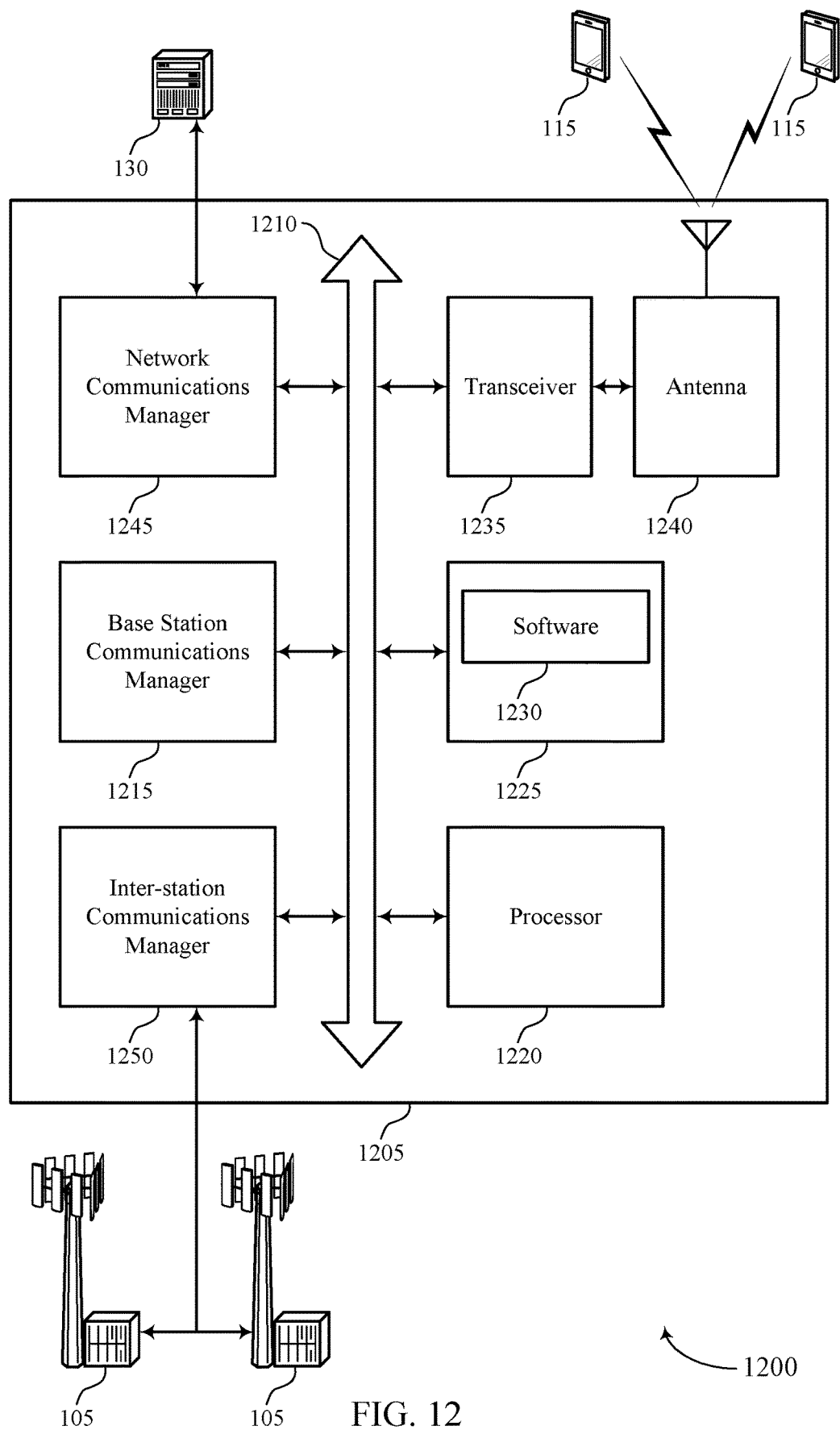
FIG. 12 illustrates a block diagram of a system including a base station that supports SRS configuration and TBS scaling in low latency systems in accordance with aspects of the present disclosure.

FIG. 12 shows a diagram of a system 1200 including a device 1205 that supports SRS configuration and TBS scaling in low latency systems in accordance with various aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting SRS configuration and TBS scaling in low latency systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support SRS configuration and TBS scaling in low latency systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
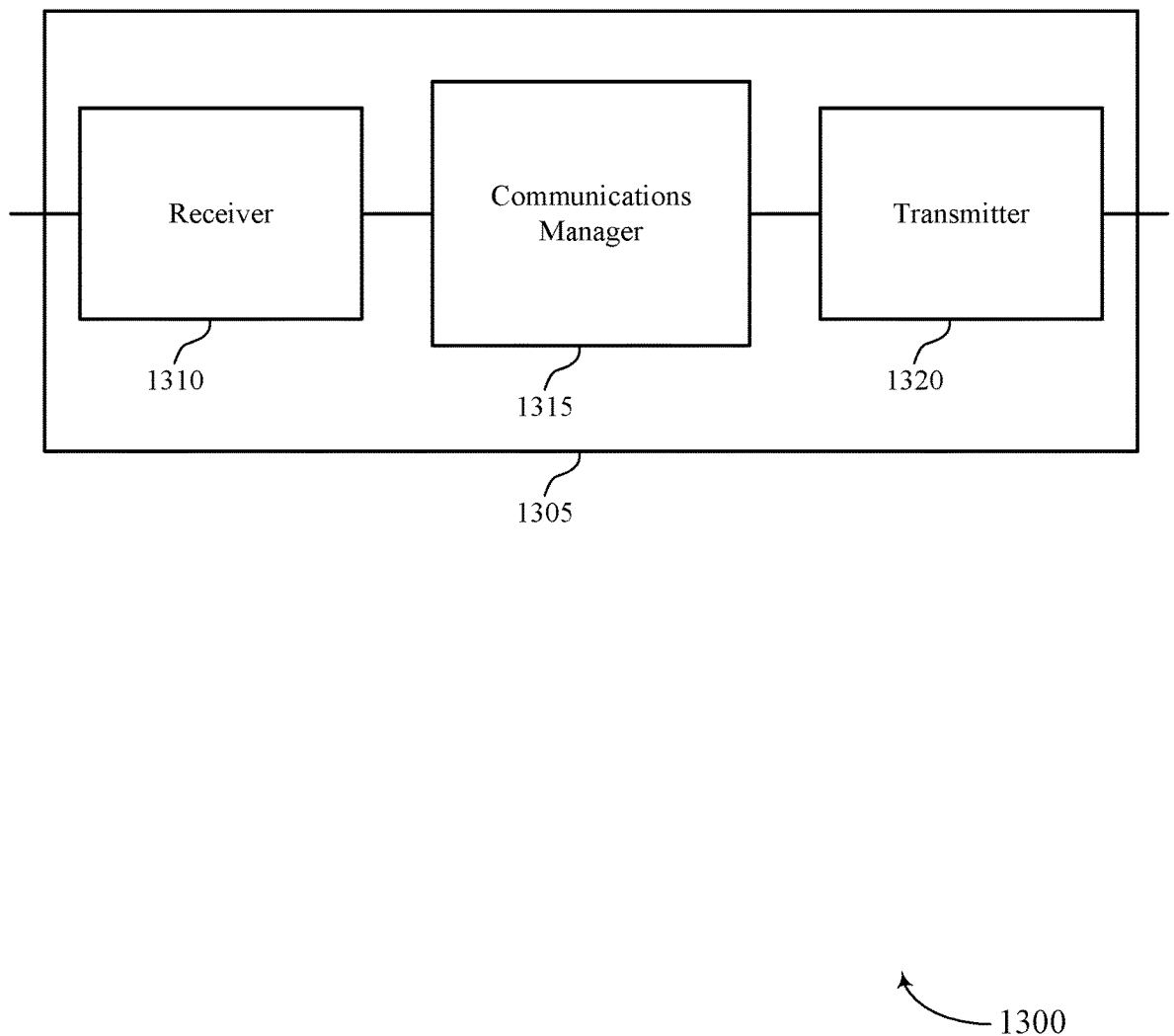
FIGS. 13-15 show block diagrams of a device that supports SRS configuration and TBS scaling in low latency systems in accordance with aspects of the present disclosure.

FIG. 13 shows a block diagram 1300 of a wireless device 1305 that supports SRS configuration and TBS scaling in low latency systems in accordance with various aspects of the present disclosure. Wireless device 1305 may be an example of aspects of a UE 115 or base station 105 as described herein. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to SRS configuration and TBS scaling in low latency systems, etc.). Information may be passed on to other components of the device. The receiver 1310 may be an example of aspects of the transceiver 1635 or transceiver 1735 described with reference to FIGS. 16 and 17. The receiver 1310 may utilize a single antenna or a set of antennas.

Communications manager 1315 may be an example of aspects of the communications manager 1615 or communications manager 1715 described with reference to FIGS. 16 and 17. Communications manager 1315 and/or at least some of its various sub-components may be implemented in hardware, software executed by a processor, firmware, or any combination thereof. If implemented in software executed by a processor, the functions of the communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315 and/or at least some of its various sub-components may be physically located at various positions, including being distributed such that portions of functions are implemented at different physical locations by one or more physical devices. In some examples, communications manager 1315 and/or at least some of its various sub-components may be a separate and distinct component in accordance with various aspects of the present disclosure. In other examples, communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1315 may identify data to transmit during a TTI having the first TTI duration, determine a number of resource elements available for transmission of the data during the TTI having the first TTI duration, and determine a TBS for transmission of the data during the TTI having the first TTI duration based on the determined number of resource elements available for transmission of the data during the TTI having the first TTI duration. Communications manager 1315 may then coordinate with transmitter 1320 to transmit the data based at least in part on the determined TBS.

Transmitter 1320 may transmit signals generated by other components of the device. In some examples, the transmitter 1320 may be collocated with a receiver 1310 in a transceiver module. The transmitter 1320 may be an example of aspects of the transceiver 1635 or transceiver 1735 described with reference to FIGS. 16 and 17. The transmitter 1320 may utilize a single antenna or a set of antennas.

Figure 14:
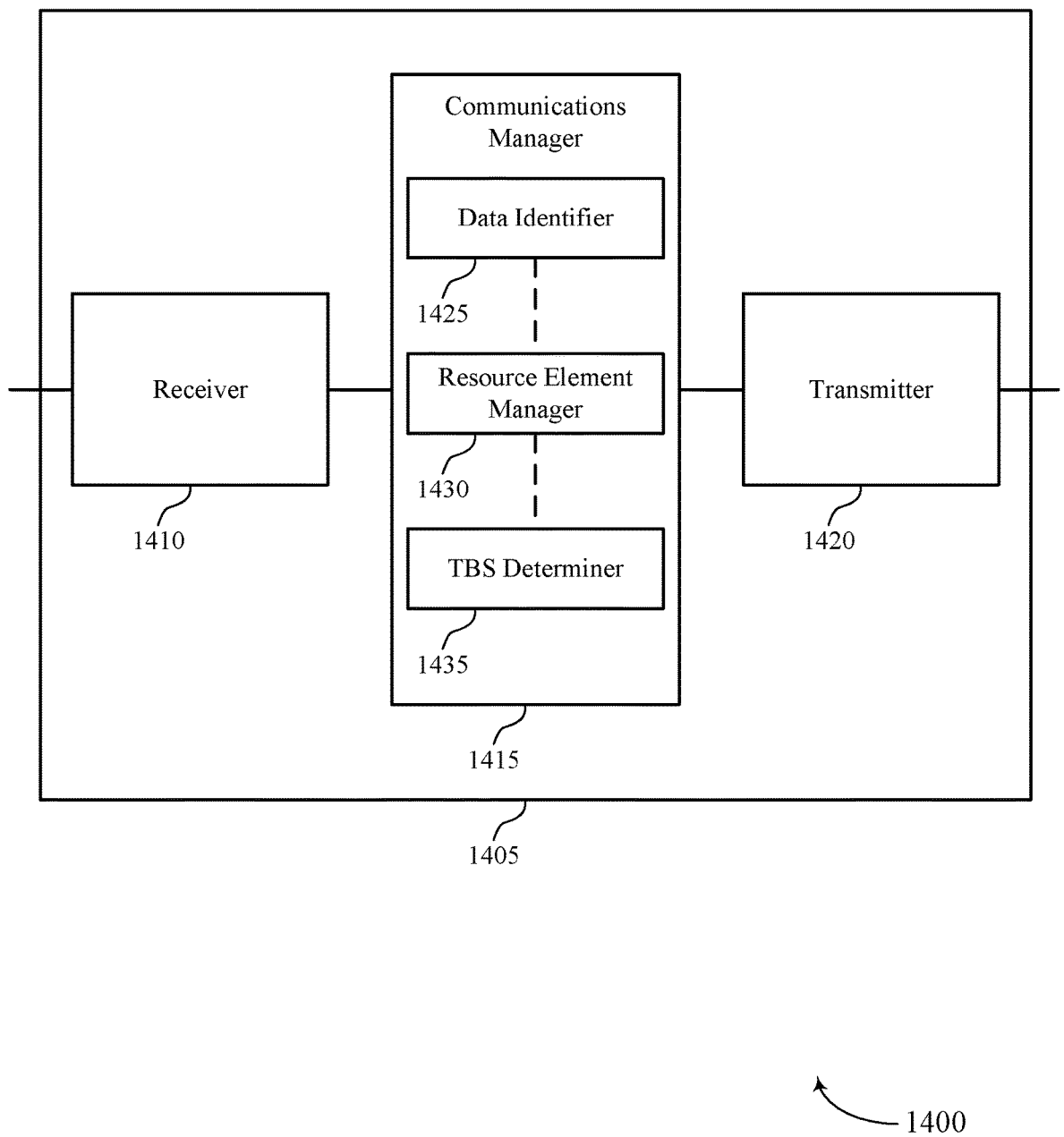

FIG. 14 shows a block diagram 1400 of a wireless device 1405 that supports SRS configuration and TBS scaling in low latency systems in accordance with various aspects of the present disclosure. Wireless device 1405 may be an example of aspects of a wireless device 1305 or a UE 115 or base station 105 as described with reference to FIG. 13. Wireless device 1405 may include receiver 1410, communications manager 1415, and transmitter 1420. Communications manager 1415 may be an example of aspects of the communications manager 1615 described with reference to FIG. 16. Communications manager 1415 may include data identifier 1425, resource element manager 1430, and TBS determiner 1435. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to SRS configuration and TBS scaling in low latency systems, etc.). Information may be passed on to other components of the device. The receiver 1410 may be an example of aspects of the transceiver 1635 or transceiver 1735 described with reference to FIGS. 16 and 17. The receiver 1410 may utilize a single antenna or a set of antennas.

Data identifier 1425 may identify data to transmit during a TTI having the first TTI duration. Resource element manager 1430 may determine a number of resource elements available for transmission of the data during the TTI having the first TTI duration. TBS determiner 1435 may determine a TBS for transmission of the data during the TTI having the first TTI duration based on the determined number of resource elements available for transmission of the data during the TTI having the first TTI duration. Communications manager 1415 may then coordinate with transmitter 1420 to transmit the data based at least in part on the determined TBS.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 or transceiver 1735 described with reference to FIGS. 16 and 17. The transmitter 1420 may utilize a single antenna or a set of antennas.

Figure 15:
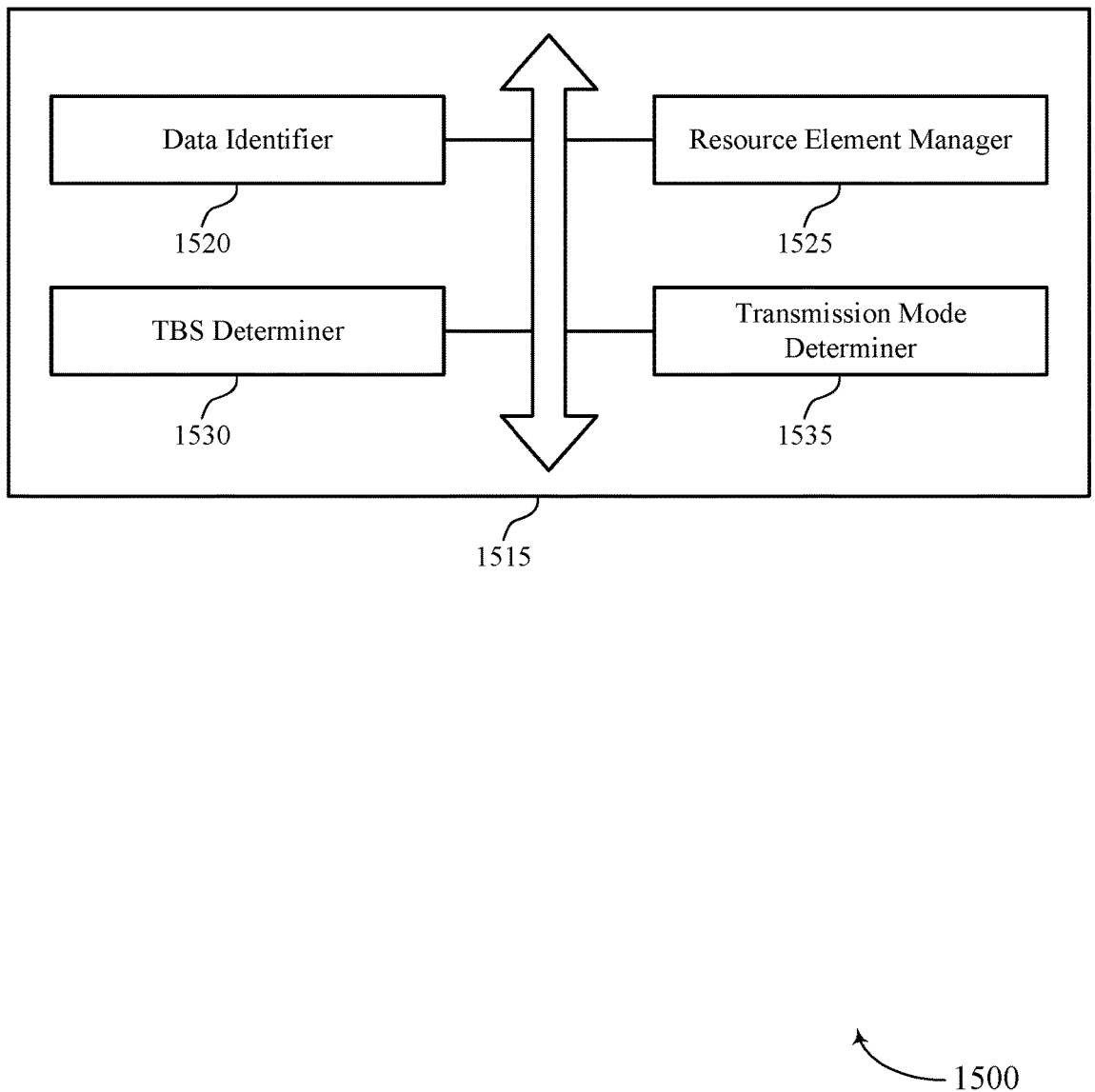

FIG. 15 shows a block diagram 1500 of a communications manager 1515 that supports SRS configuration and TBS scaling in low latency systems in accordance with various aspects of the present disclosure. The communications manager 1515 may be an example of aspects of a communications manager 1615 or communications manager 1715 described with reference to FIGS. 16 and 17. The communications manager 1515 may include data identifier 1520, resource element manager 1525, TBS determiner 1530, and transmission mode determiner 1535. Each of these modules may communicate, directly or indirectly, with one another (e.g., via one or more buses).

Data identifier 1520 may identify data to transmit during a TTI having the first TTI duration. Resource element manager 1525 may determine a number of resource elements available for transmission of the data during the TTI having the first TTI duration. TBS determiner 1530 may determine a TBS for transmission of the data during the TTI having the first TTI duration based on the determined number of resource elements available for transmission of the data during the TTI having the first TTI duration. Communications manager 1515 may then coordinate with a transmitter to transmit the data based at least in part on the determined TBS.

In some cases, determining a number of resource elements available for transmission of the data during the TTI having the first TTI duration includes identifying a number of resource elements within the TTI having the first TTI duration that are reserved for control information in a control channel associated with communications during a TTI having the second TTI duration. In some cases, identifying the number of resource elements within the TTI having the first TTI duration that are reserved for control information includes identifying a default number of resource elements within the TTI having the first TTI duration that are reserved for control information. In some cases, the control channel includes a PDCCH. In some cases, determining a number of resource elements available for transmission of the data during the TTI having the first TTI duration includes identifying a number of resource elements within the TTI having the first TTI duration that are reserved for control information in a control channel associated with communications during a TTI having the first TTI duration. In some cases, the control channel includes an sPDCCH.

In some cases, transmission mode determiner 1535 may determine whether a TM used for communication during the TTI having the first TTI duration is CRS-based or DMRS-based, and TBS determiner 1530 may determine the TBS for the transmission based on determining whether the TM is CRS-based or DMRS-based.

Figure 16:
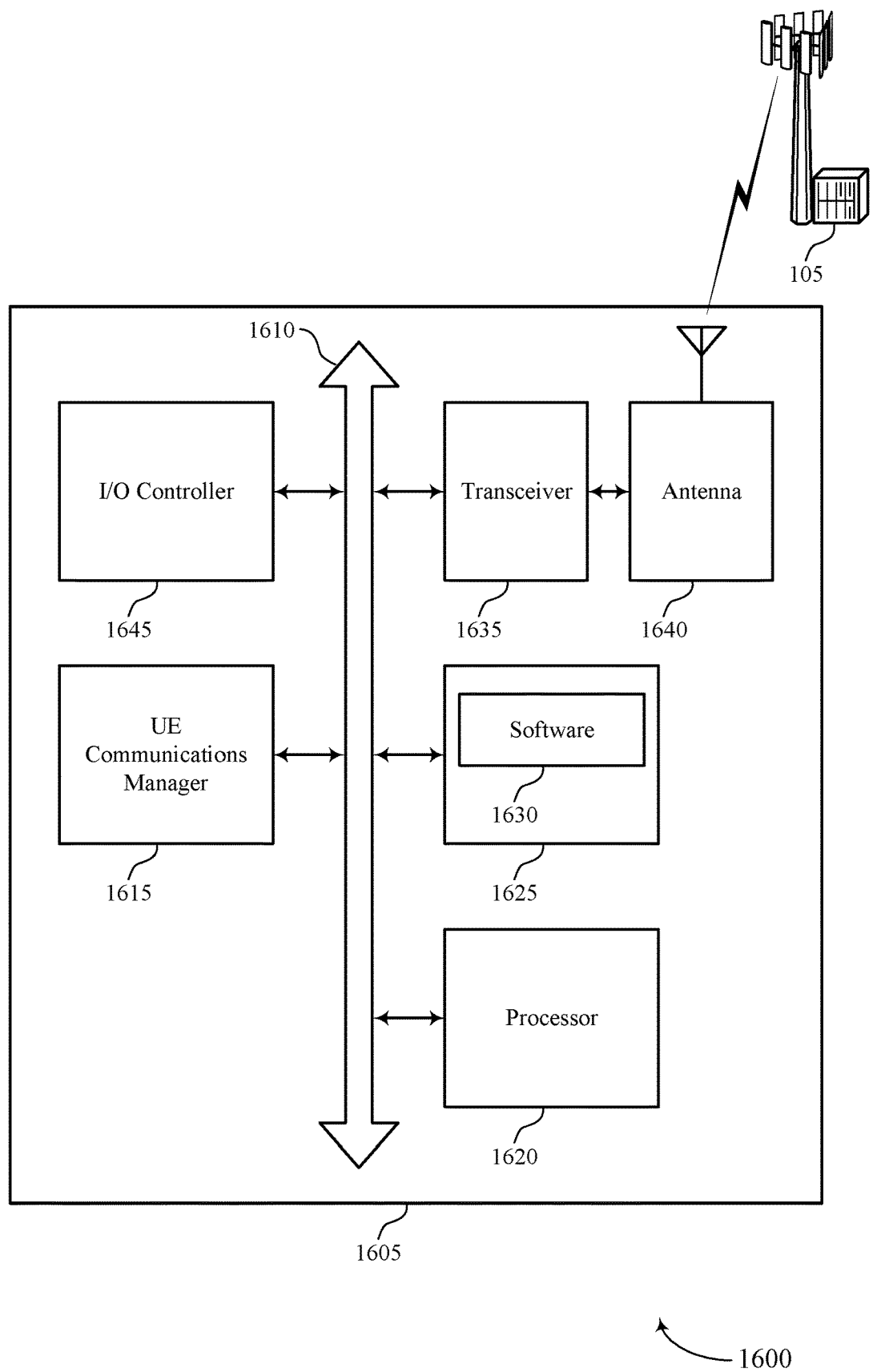
FIG. 16 illustrates a block diagram of a system including a UE that supports SRS configuration and TBS scaling in low latency systems in accordance with aspects of the present disclosure.

FIG. 16 shows a diagram of a system 1600 including a device 1605 that supports SRS configuration and TBS scaling in low latency systems in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting SRS configuration and TBS scaling in low latency systems).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support SRS configuration and TBS scaling in low latency systems. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
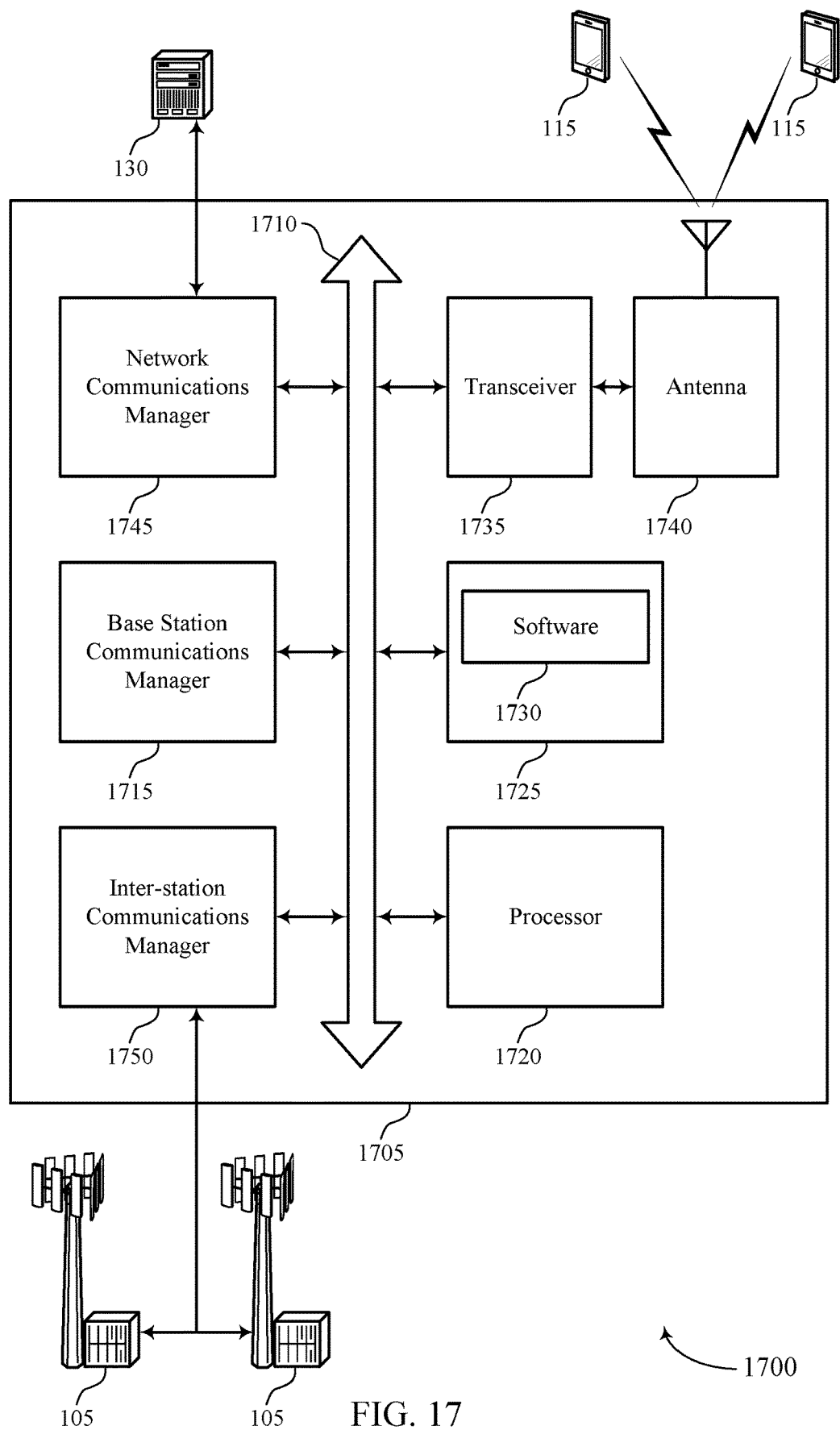
FIG. 17 illustrates a block diagram of a system including a base station that supports SRS configuration and TBS scaling in low latency systems in accordance with aspects of the present disclosure.

FIG. 17 shows a diagram of a system 1700 including a device 1705 that supports SRS configuration and TBS scaling in low latency systems in accordance with various aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting SRS configuration and TBS scaling in low latency systems).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support SRS configuration and TBS scaling in low latency systems. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an LTE/LTE-A wireless communication network technology to provide communication between base stations 105.

Figure 18:
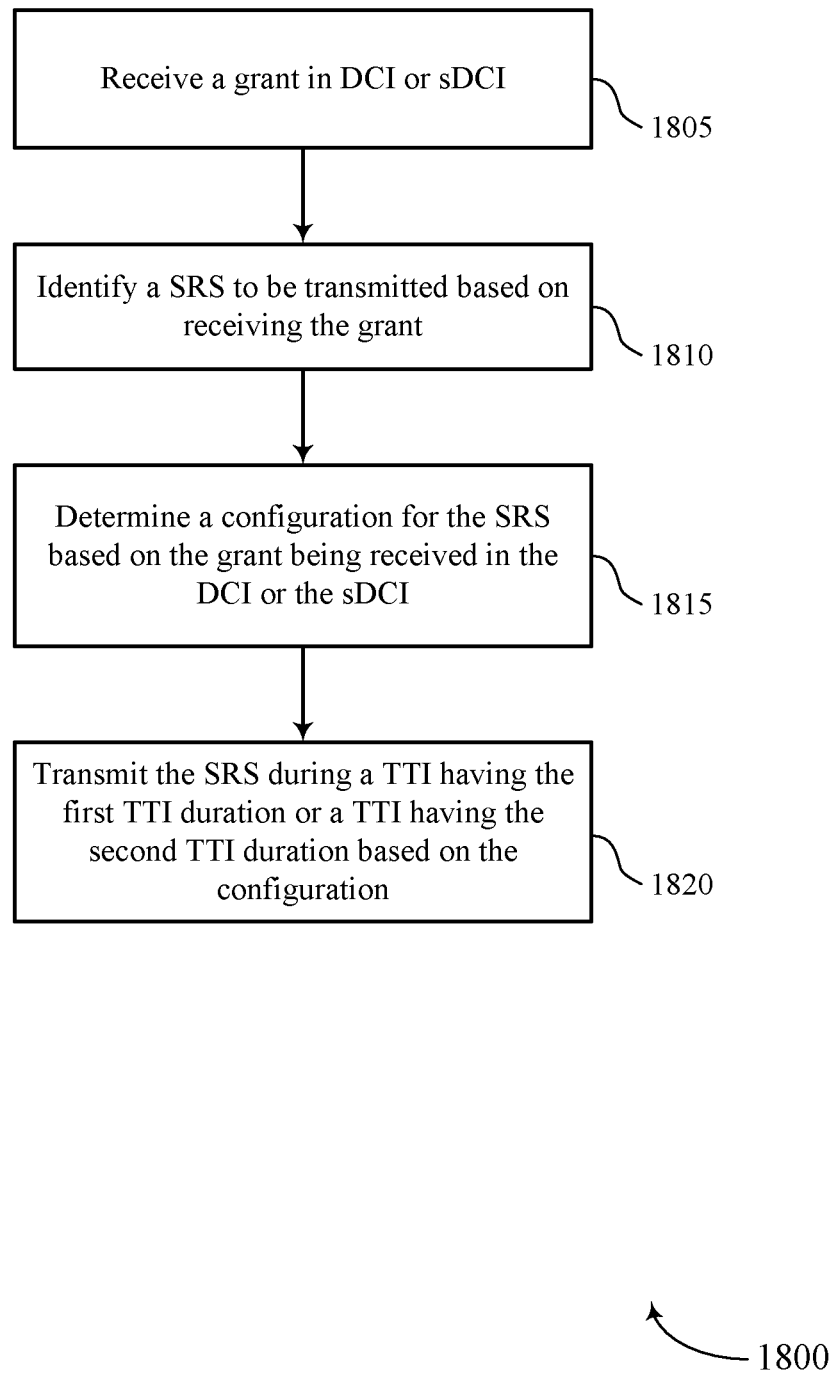
FIGS. 18-22 illustrate methods for SRS configuration and TBS scaling in low latency systems in accordance with aspects of the present disclosure.

FIG. 18 shows a flowchart illustrating a method 1800 for SRS configuration and TBS scaling in low latency systems in accordance with various aspects of the present disclosure. The operations of method 1800 may be implemented by a UE 115 or its components as described herein. For example, the operations of method 1800 may be performed by a UE communications manager as described with reference to FIGS. 6 through 15. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a grant in DCI or sDCI. The operations of block 1805 may be performed according to the methods described herein. In certain examples, aspects of the operations of block 1805 may be performed by a grant manager as described with reference to FIGS. 7 and 8.

At block 1810 the UE 115 may identify an SRS to be transmitted based on receiving the grant. The operations of block 1810 may be performed according to the methods described herein. In certain examples, aspects of the operations of block 1810 may be performed by an SRS identifier as described with reference to FIGS. 7 and 8.

At block 1815 the UE 115 may determine a configuration for the SRS based at least in part on the grant being received in the DCI or the sDCI. The operations of block 1815 may be performed according to the methods described herein. In certain examples, aspects of the operations of block 1815 may be performed by an SRS configuration manager as described with reference to FIGS. 7 and 8.

At block 1820 the UE 115 may transmit the SRS during a TTI having the first TTI duration or a TTI having the second TTI duration based at least in part on the configuration. The operations of block 1820 may be performed according to the methods described herein. In certain examples, aspects of the operations of block 1820 may be performed by a transmitter as described with reference to FIGS. 7 and 8.

Figure 19:
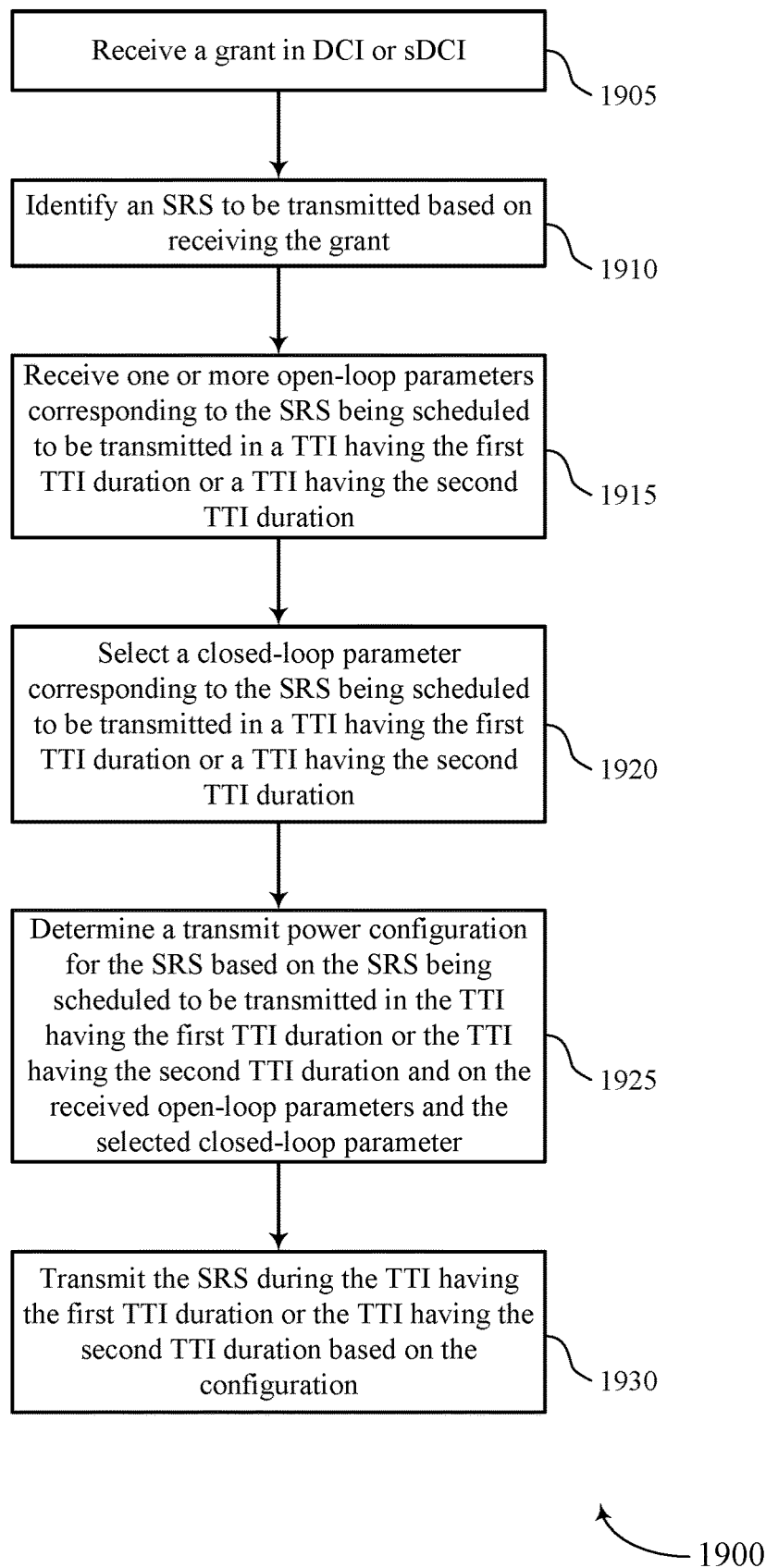

FIG. 19 shows a flowchart illustrating a method 1900 for SRS configuration and TBS scaling in low latency systems in accordance with various aspects of the present disclosure. The operations of method 1900 may be implemented by a UE 115 or its components as described herein. For example, the operations of method 1900 may be performed by a UE communications manager as described with reference to FIGS. 6 through 15. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a grant in DCI or sDCI. The operations of block 1905 may be performed according to the methods described herein. In certain examples, aspects of the operations of block 1905 may be performed by a grant manager as described with reference to FIGS. 7 and 8.

At block 1910 the UE 115 may identify an SRS to be transmitted based on receiving the grant. The operations of block 1910 may be performed according to the methods described herein. In certain examples, aspects of the operations of block 1910 may be performed by an SRS identifier as described with reference to FIGS. 7 and 8.

At block 1915 the UE 115 may receive one or more open-loop parameters corresponding to the SRS being scheduled to be transmitted in a TTI having the first TTI duration or a TTI having the second TTI duration. The operations of block 1915 may be performed according to the methods described herein. In certain examples, aspects of the operations of block 1915 may be performed by an SRS transmit power configuration manager as described with reference to FIGS. 7 and 8.

At block 1920 the UE 115 may select a closed-loop parameter corresponding to the SRS being scheduled to be transmitted in a TTI having the first TTI duration or a TTI having the second TTI duration. The operations of block 1920 may be performed according to the methods described herein. In certain examples, aspects of the operations of block 1920 may be performed by an SRS transmit power configuration manager as described with reference to FIGS. 7 and 8.

At block 1925 the UE 115 may determine a transmit power configuration for the SRS based at least in part on the SRS being scheduled to be transmitted in the TTI having the first TTI duration or the TTI having the second TTI duration and on the received open-loop parameters and the selected closed-loop parameter. The operations of block 1925 may be performed according to the methods described herein. In certain examples, aspects of the operations of block 1925 may be performed by an SRS configuration manager as described with reference to FIGS. 7 and 8.

At block 1930 the UE 115 may transmit the SRS during the TTI having the first TTI duration or the TTI having the second TTI duration based at least in part on the configuration. The operations of block 1930 may be performed according to the methods described herein. In certain examples, aspects of the operations of block 1930 may be performed by a transmitter as described with reference to FIGS. 7 and 8.

Figure 20:
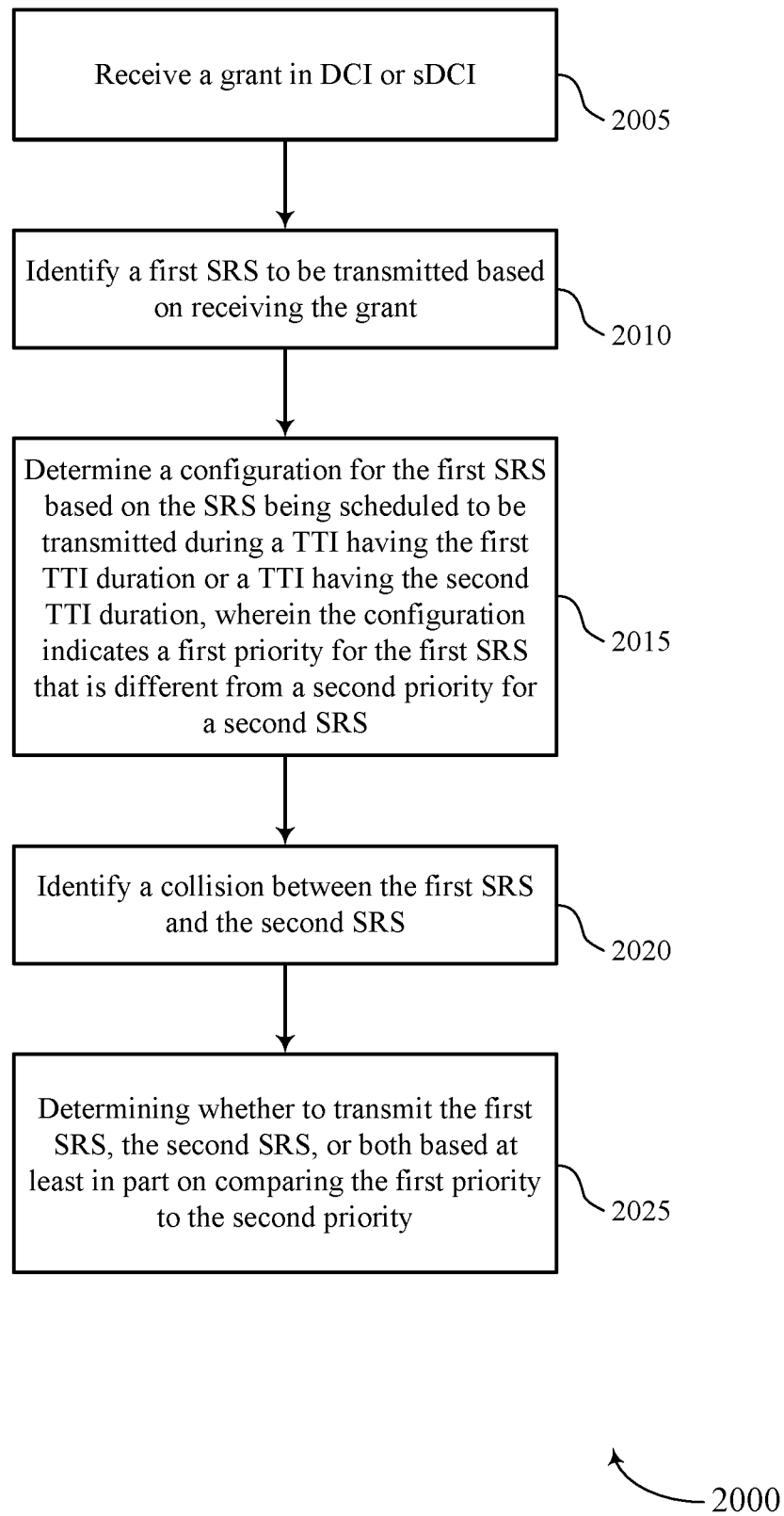

FIG. 20 shows a flowchart illustrating a method 2000 for SRS configuration and TBS scaling in low latency systems in accordance with various aspects of the present disclosure. The operations of method 2000 may be implemented by a UE 115 or its components as described herein. For example, the operations of method 2000 may be performed by a UE communications manager as described with reference to FIGS. 6 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a grant in DCI or sDCI. The operations of block 2005 may be performed according to the methods described herein. In certain examples, aspects of the operations of block 2005 may be performed by a grant manager as described with reference to FIGS. 7 and 8.

At block 2010 the UE 115 may identify a first SRS to be transmitted based on receiving the grant. The operations of block 2010 may be performed according to the methods described herein. In certain examples, aspects of the operations of block 2010 may be performed by an SRS identifier as described with reference to FIGS. 7 and 8.

At block 2015 the UE 115 may determine a configuration for the first SRS based on the SRS being scheduled to be transmitted during a TTI having the first TTI duration or a TTI having the second TTI duration, wherein the configuration indicates a first priority for the first SRS that is different from a second priority for a second SRS. The operations of block 2015 may be performed according to the methods described herein. In certain examples, aspects of the operations of block 2015 may be performed by an SRS configuration manager as described with reference to FIGS. 7 and 8.

At block 2020 the UE 115 may identify a collision between the first SRS and the second SRS. The operations of block 2015 may be performed according to the methods described herein. In certain examples, aspects of the operations of block 2015 may be performed by an SRS collision manager as described with reference to FIGS. 7 and 8.

At block 2025 the UE 115 may determine whether to transmit the first SRS, the second SRS, or both based at least in part on comparing the first priority to the second priority. The operations of block 2025 may be performed according to the methods described herein. In certain examples, aspects of the operations of block 2025 may be performed by an SRS collision manager as described with reference to FIGS. 7 and 8.

Figure 21:
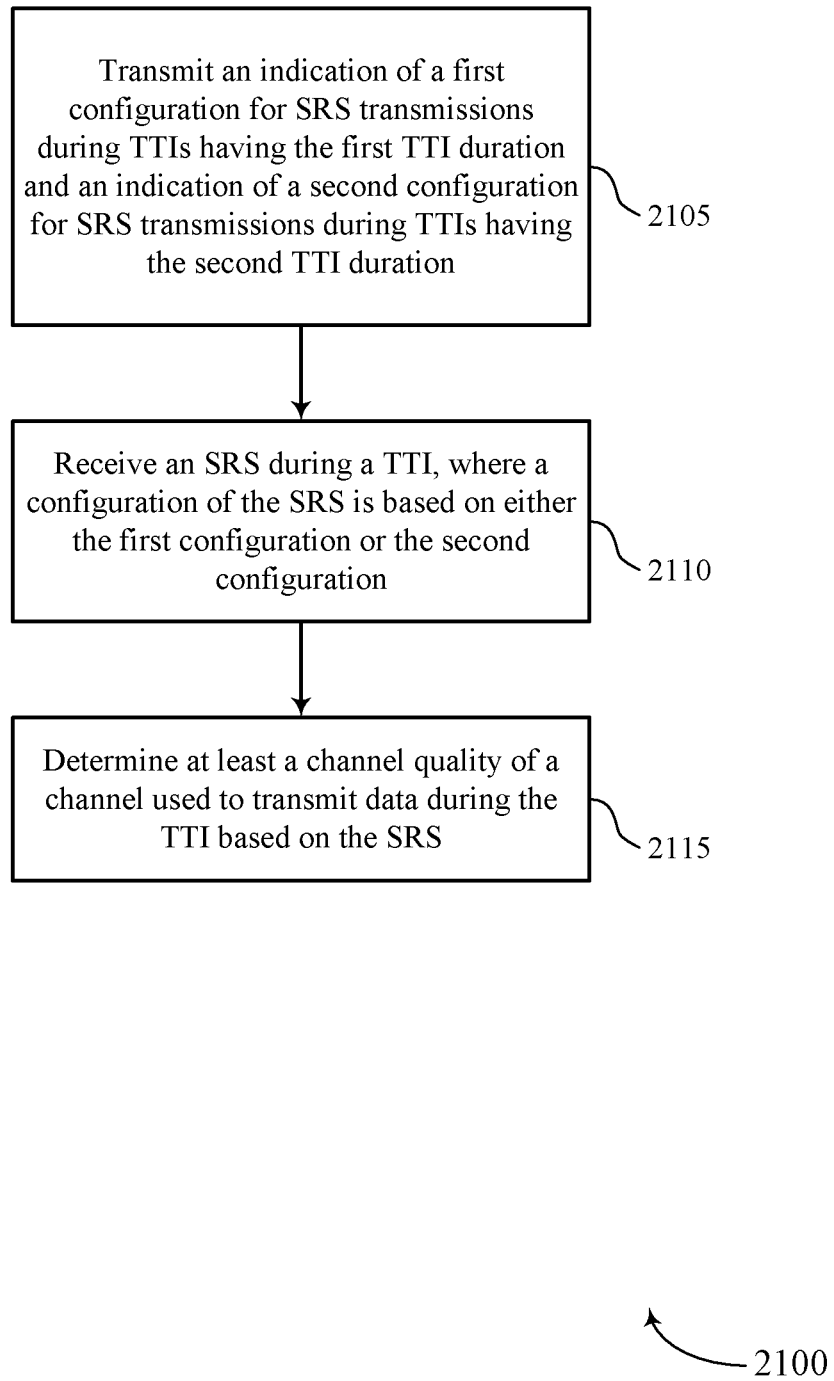

FIG. 21 shows a flowchart illustrating a method 2100 for SRS configuration and TBS scaling in low latency systems in accordance with various aspects of the present disclosure. The operations of method 2100 may be implemented by a base station 105 or its components as described herein. For example, the operations of method 2100 may be performed by a base station communications manager as described with reference to FIGS. 10 through 17. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may transmit an indication of a first configuration for SRS transmissions during TTIs having the first TTI duration and an indication of a second configuration for SRS transmissions during TTIs having the second TTI duration. The operations of block 2105 may be performed according to the methods described herein. In certain examples, aspects of the operations of block 2105 may be performed by an SRS configuration manager as described with reference to FIGS. 10 through 17.

At block 2110 the base station 105 may receive an SRS during a TTI, wherein a configuration of the SRS is based at least in part on either the first configuration or the second configuration. The operations of block 2110 may be performed according to the methods described herein. In certain examples, aspects of the operations of block 2110 may be performed by a receiver as described with reference to FIGS. 10 through 17.

At block 2115 the base station 105 may determine at least a channel quality of a channel used to transmit data during the TTI based at least in part on the SRS. The operations of block 2115 may be performed according to the methods described herein. In certain examples, aspects of the operations of block 2115 may be performed by a channel quality manager as described with reference to FIGS. 10 through 17.

Figure 22:
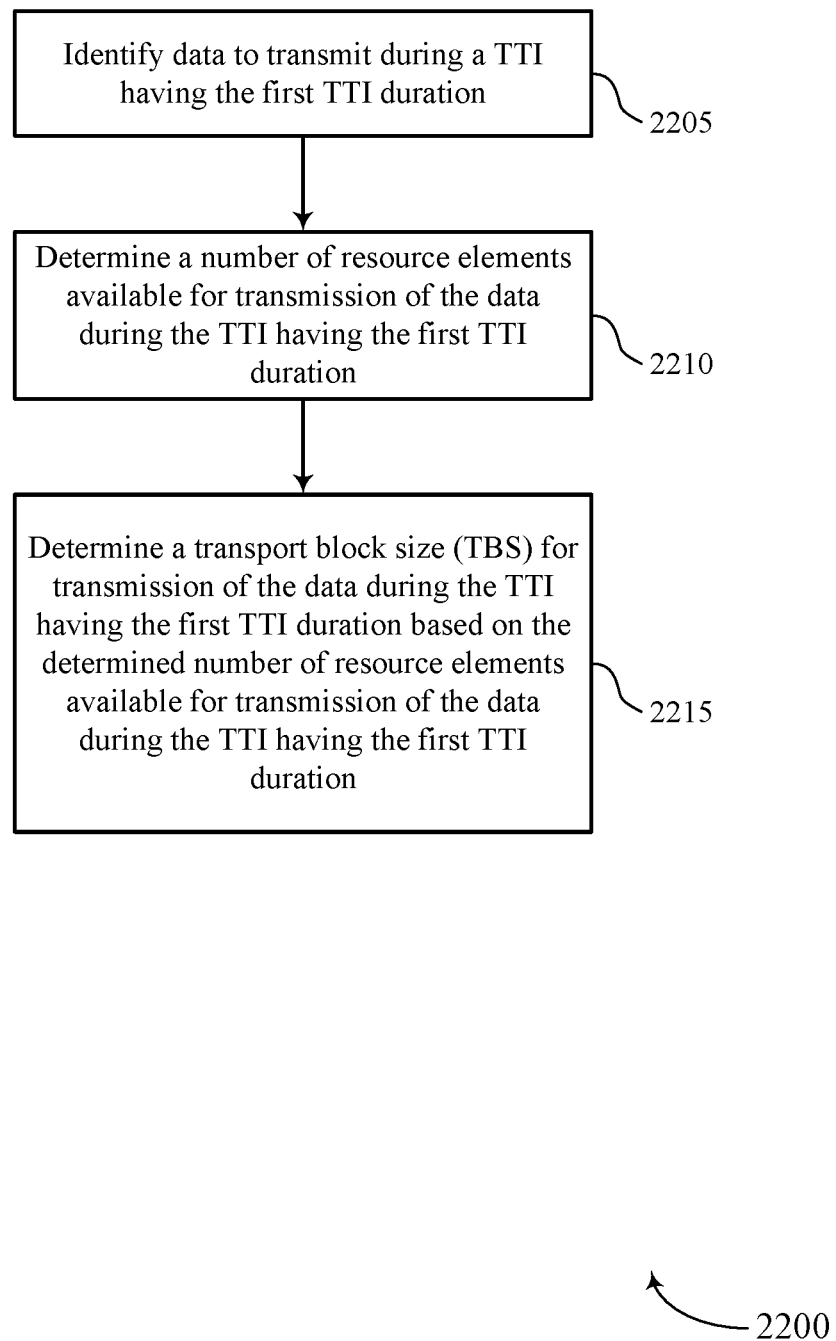

FIG. 22 shows a flowchart illustrating a method 2200 for SRS configuration and TBS scaling in low latency systems in accordance with various aspects of the present disclosure. The operations of method 2200 may be implemented by a UE 115 or base station 105 or its components as described herein. For example, the operations of method 2200 may be performed by a communications manager as described with reference to FIGS. 13 through 15. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 2205 the UE 115 or base station 105 may identify data to transmit during a TTI having the first TTI duration. The operations of block 2205 may be performed according to the methods described herein. In certain examples, aspects of the operations of block 2205 may be performed by a data identifier as described with reference to FIGS. 13 through 15.

At block 2210 the UE 115 or base station 105 may determine a number of resource elements available for transmission of the data during the TTI having the first TTI duration. The operations of block 2210 may be performed according to the methods described herein. In certain examples, aspects of the operations of block 2210 may be performed by a resource element manager as described with reference to FIGS. 13 through 15.

At block 2215 the UE 115 or base station 105 may determine a TBS for transmission of the data during the TTI having the first TTI duration based at least in part on the determined number of resource elements available for transmission of the data during the TTI having the first TTI duration. The operations of block 2215 may be performed according to the methods described herein. In certain examples, aspects of the operations of block 2215 may be performed by a TBS determiner as described with reference to FIGS. 13 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a geographic coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the geographic coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports a first transmission time interval (TTI) duration and a second TTI duration that is greater than the first TTI duration, comprising:
   receiving an indication of a first configuration for SRS transmissions during TTIs having the first TTI duration and an indication of a second configuration for SRS transmissions during TTIs having the second TTI duration;
   receiving a short downlink control information (sDCI) triggering a sounding reference signal (SRS) to be transmitted in a TTI of the first TTI duration, the sDCI being received in a TTI having the second TTI duration; and
   transmitting the SRS during the TTI having the first TTI duration based at least in part on the first configuration for SRS transmissions and according to a first power control adjustment state based at least in part on a first transmit power control (TPC) command received in the sDCI.

2. The method of claim 1, further comprising:
   determining a transmit power configuration for the SRS based at least in part on the SRS being scheduled to be transmitted in the TTI having the first TTI duration.

3. The method of claim 1, further comprising:
   determining a transmit power configuration for the SRS according to the first configuration when the SRS is scheduled to be transmitted in the TTI having the first TTI duration and according to the second configuration when the SRS is scheduled to be transmitted in the TTI having the second TTI duration.

4. The method of claim 3, further comprising:
   receiving one or more open-loop power parameters corresponding to the SRS being scheduled to be transmitted in the TTI having the first TTI duration; and
   selecting a closed-loop power parameter corresponding to the SRS being scheduled to be transmitted in the TTI having the first TTI duration.

5. The method of claim 4, wherein the closed-loop power parameter is the first power control adjustment state that corresponds to the SRS being scheduled to be transmitted in the TTI having the first TTI duration.

6. The method of claim 4, wherein the one or more open-loop power parameters comprise:
   a maximum transmit power, an SRS offset, or a bandwidth used to transmit the SRS, or a combination thereof, corresponding to the SRS being scheduled to be transmitted in the TTI having the first TTI duration.

7. The method of claim 1, wherein receiving the sDCI comprises:
   receiving a grant in the sDCI, wherein the sDCI triggering the SRS to be transmitted in the the TTI of the first TTI duration, the sDCI being received in a TTI having the second TTI duration.

8. The method of claim 1, further comprising:
   receiving multiple transmit power configurations during multiple TTIs for the SRS to be transmitted during the TTI having the first TTI duration or the TTI having the second TTI duration; and
   determining a transmit power configuration for the SRS based at least in part on at least one of the multiple transmit power configurations corresponding to the SRS being transmitted during the TTI having the first TTI duration.

9. The method of claim 8, wherein determining the transmit power configuration for the SRS based at least in part on at least one of the multiple transmit power configurations corresponding to the SRS being transmitted during the TTI having the first TTI duration comprises:
   determining the transmit power configuration for the SRS based at least in part on an accumulation of the multiple transmit power configurations.

10. The method of claim 8, wherein determining the transmit power configuration for the SRS based at least in part on at least one of the multiple transmit power configurations corresponding to the SRS being transmitted during the TTI having the first TTI duration comprises:
    determining the transmit power configuration for the SRS based at least in part on a highest or lowest transmit power indicated in one of the multiple transmit power configurations.

11. The method of claim 8, wherein determining the transmit power configuration for the SRS based at least in part on at least one of the multiple transmit power configurations corresponding to the SRS being transmitted during the TTI having the first TTI duration comprises:

determining the transmit power configuration for the SRS based at least in part on an average of transmit powers indicated in the multiple transmit power configurations.

12. The method of claim 8, wherein the multiple transmit power configurations indicate a same transmit power configuration to be used to transmit the SRS.

13. The method of claim 1, further comprising:

determining a transmit power configuration for the SRS based at least in part on a number of symbols of the SRS being scheduled to be transmitted in the TTI having the first TTI duration.

14. An apparatus for wireless communication in a system that supports a first transmission time interval (TTI) duration and a second TTI duration that is greater than the first TTI duration, comprising:

means for receiving an indication of a first configuration for SRS transmissions during TTIs having the first TTI duration and an indication of a second configuration for SRS transmissions during TTIs having the second TTI duration;

means for receiving a short downlink control information (sDCI) triggering a sounding reference signal (SRS) to be transmitted in a TTI of the first TTI duration, the sDCI being received in a TTI having the second TTI duration; and means for transmitting the SRS during the TTI having the first TTI duration based at least in part on the first configuration for SRS transmissions and according to a first power control adjustment state based at least in part on a first transmit power control (TPC) command received in the sDCI.

15. The apparatus of claim 14, further comprising:

means for determining a transmit power configuration for the SRS based at least in part on a number of symbols of the SRS being scheduled to be transmitted in the TTI having the first TTI duration.

16. A mobile device for wireless communication in a system that supports a first transmission time interval (TTI) duration and a second TTI duration that is greater than the first TTI duration, comprising:

a processor;

memory coupled with the processor; and instructions stored in the memory and operable, when executed by the processor, to cause the mobile device to:

receive an indication of a first configuration for SRS transmissions during TTIs having the first TTI duration and an indication of a second configuration for SRS transmissions during TTIs having the second TTI duration;

receive a short downlink control information (sDCI) triggering a sounding reference signal (SRS) to be transmitted in a TTI of the first TTI duration, the sDCI being received in a TTI having the second TTI duration; and transmit the SRS during the TTI having the first TTI duration based at least in part on the first configuration for SRS transmissions and according to a first power control adjustment state based at least in part on a first transmit power control (TPC) command received in the sDCI.

17. The mobile device of claim 16, wherein the instructions are further executable to cause the processor to:

determine a transmit power configuration for the SRS based at least in part on a number of symbols of the SRS being scheduled to be transmitted in the TTI having the first TTI duration.

18. A non-transitory computer readable medium storing code for wireless communication in a system that supports a first transmission time interval (TTI) duration and a second TTI duration that is greater than the first TTI duration, the code comprising instructions executable by a processor to:

receive an indication of a first configuration for SRS transmissions during TTIs having the first TTI duration and an indication of a second configuration for SRS transmissions during TTIs having the second TTI duration;

receive a short downlink control information (sDCI) triggering a sounding reference signal (SRS) to be transmitted in a TTI of the first TTI duration, the sDCI being received in a TTI having the second TTI duration; and transmit the SRS during the TTI having the first TTI duration based at least in part on the first configuration for SRS transmissions and according to a first power control adjustment state based at least in part on a first transmit power control (TPC) command received in the sDCI.

19. The non-transitory computer readable medium of claim 18, wherein the code further comprises instructions executable by the processor to:

determine a transmit power configuration for the SRS based at least in part on a number of symbols of the SRS being scheduled to be transmitted in the TTI having the first TTI duration.

* * * * *